United States Patent
Urabe et al.

(10) Patent No.: US 9,935,466 B2
(45) Date of Patent: Apr. 3, 2018

(54) ELECTRIC POWER GENERATION OPERATION POINT CONTROL CIRCUIT DEVICE

(71) Applicants: Toyota Jidosha Kabushiki Kaisha, Toyota-shi Aichi-ken (JP); Tokyo Metropolitan University, Tokyo (JP)

(72) Inventors: Shinichi Urabe, Shizuoka-ken (JP); Toshihisa Shimizu, Fuchu (JP)

(73) Assignees: Toyota Jidosha Kabushiki Kaisha, Toyota-shi (JP); Tokyo Metropolitan University, Tokyo (JP)

( * ) Notice: Subject to any disclaimer, the term of this patent is extended or adjusted under 35 U.S.C. 154(b) by 42 days.

(21) Appl. No.: 15/267,320

(22) Filed: Sep. 16, 2016

(65) Prior Publication Data
US 2017/0085092 A1    Mar. 23, 2017

(30) Foreign Application Priority Data
Sep. 18, 2015    (JP) .................................. 2015-184851

(51) Int. Cl.
| H02J 1/00 | (2006.01) |
| H02J 3/00 | (2006.01) |
| H02J 3/38 | (2006.01) |
| H02J 1/10 | (2006.01) |

(52) U.S. Cl.
CPC .............. H02J 3/385 (2013.01); H02J 1/102 (2013.01); Y02E 10/58 (2013.01)

(58) Field of Classification Search
CPC ............ H02J 1/102; H02J 3/385; Y02E 10/58
USPC ........................................................ 307/77
See application file for complete search history.

(56) References Cited

U.S. PATENT DOCUMENTS

| 5,420,497 A | 5/1995 | Kimura et al. |
| 8,624,436 B2 * | 1/2014 | Willis .................... G05F 1/67 |
| | | 307/77 |

FOREIGN PATENT DOCUMENTS

JP    H06-284601 A    10/1994

OTHER PUBLICATIONS

Shimizu et al., Improvement of the Efficiency Characteristics on the Photovoltaic Generation System based on a Generation Control Circuit, Solar/Wind Power Energy Lecture Paper, 1996, pp. 57-60 (cited in specification).
Toshihisa Shimizu, "Generation Control Circuitry for Operating Point Normalization of Photovoltaic Modules", FB Technical News, No. 56, Nov. 1, 2000, pp. 22-27 (cited in specification).

(Continued)

Primary Examiner — Daniel Kessie
Assistant Examiner — Toan Vu
(74) Attorney, Agent, or Firm — Dinsmore & Shohl LLP

(57) ABSTRACT

Three or more photovoltaic cell units connected in series include a unit holding a voltage between output terminals, a first voltage holding unit group having a voltage holding unit holding a voltage between an anode-side terminal and a cathode-side terminal for each photovoltaic cell unit set with respect to each set of the (2k+1)th and (2k+2)th photovoltaic cell units connected in series to each other counted from the anode side, and a second voltage holding unit group having a voltage holding unit holding a voltage between an anode-side terminal and a cathode-side terminal for each photovoltaic cell unit set with respect to each set of the (2k+2)th and (2k+3)th photovoltaic cell units connected in series to each other counted from the anode side.

9 Claims, 7 Drawing Sheets

(56) References Cited

OTHER PUBLICATIONS

Toshihisa Shimizu, "Generation Control Circuit for Photovoltaic Modules" IEEE Transactions on Power Electronics, vol. 16, No. 3, May 2001, pp. 293-300 (cited in specification).
Barrade et al., "Energy storage system using a series connection of supercapacitors, with an active device for equalizing the voltages", Laboratoire d'Electronique Inductrielle Swiss Federal Institute of Technology Lausanne, Apr. 2000, pp. 1555-1560.

* cited by examiner

ELECTRIC POWER GENERATION OPERATION POINT CONTROL CIRCUIT DEVICE

CROSS-REFERENCE TO RELATED APPLICATIONS

This application claim priority to Japanese Patent Application No. 2015-184851 filed on Sep. 18, 2015, the entire contents of which are hereby incorporated by reference.

BACKGROUND

1. Technical Field

This application relates to an electric power generation operation point control circuit device for a photovoltaic cell and, more particularly, to a device that is an electric power generation operation point control circuit device for photovoltaic cells which are connected in series and allows each of the photovoltaic cells to perform electric power generation at its maximum electric power point.

2. Description of Related Art

In general, an electric power generation voltage of a photovoltaic cell (cell) is lower than operation voltages of various machinery and equipment and chargers. Accordingly, in photovoltaic electric power generation systems, a configuration in which a plurality of photovoltaic cells are connected in series (photovoltaic cell module) is adopted as a method for using the photovoltaic cell for operations of such machinery and equipment and charging of such chargers. In the photovoltaic cell module in which the plurality of photovoltaic cells are connected in series, an unevenness in light reception amount and a shadow or the like might arise on some of the cells due to a difference between installation angles of the respective photovoltaic cells, buildings, and the like. Once the light reception amount variation occurs between the cells, the cell with a smaller electric power generation amount becomes resistance (reverse-bias diode), and then the photovoltaic cell module might be subjected to a decline in output.

More specifically, as is well known in this field, the photovoltaic cell has a characteristic that a current changes as an electric power generation voltage increases from 0 V as is exemplified in FIG. 6. An optimal operation point (referred to as a maximum electric power point or an optimum operation point) is present in generated electric power, and the generated electric power is at its maximum magnitude at the optimal operation point. In the case of the photovoltaic cell module in which the plurality of photovoltaic cells are connected in series as described above, the maximum output points of all the photovoltaic cells substantially correspond to each other, and thus it is assumed that a common current at the maximum output point flows through all the photovoltaic cells connected in series. In actuality, however, the light reception amounts of some of the photovoltaic cells in the photovoltaic cell module might decrease as described above and, in this case, only the electric power generation characteristics of the photovoltaic cells subjected to the decline in light reception amount change for the current to decrease with respect to the electric power generation voltage, causing a maximum output point deviation. Then, the same current flows through the photovoltaic cells that have different maximum output points in the circuit configuration in which the photovoltaic cells are connected in series, and the cell with a smaller light reception amount (cell with a smaller electric power generation amount) becomes resistant to the current and no electric power generation is performed by the cell with a smaller light reception amount (cell with a smaller electric power generation amount) in a case where the current is adapted to the maximum output point of the cell with a larger light reception amount. Then, a reduction in photovoltaic cell module output follows (an output loss ensues and an electric power generation output commensurate with the light reception amount of the photovoltaic cell module cannot be obtained).

In this regard, electric power generation operation point control circuit devices that are capable of individually controlling the respective operation points of the photovoltaic cells which are connected in series as is exemplified in FIG. 7A have been proposed in the following three non-patent documents as devices for avoiding the decline in output that is attributable to the variation in light reception amount of the photovoltaic cells.

Toshihisa Shimizu and six others, Solar/Wind Power Energy Lecture Paper, 1996, pages 57 to 60

Toshihisa Shimizu, FB Technical News No. 56, Nov. 1, 2000, pages 22 to 27

Toshihisa Shimizu and three others, "Generation Control Circuit for Photovoltaic Modules" IEEE TRANSACTIONS ON POWER ELECTRONICS, VOL. 16, NO. 3, MAY 2001, pages 293 to 300

The electric power generation operation point control circuit device controls the electric power generation voltage, by using a multi-stage boosting chopper circuit with respect to the circuit configuration in which the plurality of photovoltaic cells are connected in series, such that the currents at the respective maximum electric power points flow through the photovoltaic cells. Then, all the photovoltaic cells can perform electric power generation substantially at the maximum electric power points. According to the electric power generation operation point control circuit device, even the photovoltaic cell with a smaller light reception amount is allowed to be operated at its maximum output point, and thus generated electric power commensurate with the light reception amount of the photovoltaic cell module is obtained. In addition, the photovoltaic cell subjected to the light reception amount decline does not become a reverse-bias diode, and thus the output loss can be reduced.

Japanese Patent Application Publication No. 6-284601 (JP 6-284601 A) discloses an example of a circuit device that allows a charger to be efficiently charged with an electric power generation output of a photovoltaic cell by reducing a loss of a switching element regarding a configuration in which a chopper circuit is used during a photovoltaic cell operation control.

In the case of installation of an electric power generation apparatus or an electric power generation facility based on the photovoltaic cell module that is formed by the photovoltaic cells which are connected in series, photovoltaic cell columns (hereinafter, referred to as a "photovoltaic cell strings") are configured normally by the plurality of photovoltaic cells connected in series being aligned in a strip shape as schematically drawn in FIG. 8A and the photovoltaic cell module is configured by the photovoltaic cell strings being aligned in a direction perpendicular to a longitudinal direction of the strip-shaped structure. At this time, the photovoltaic cell strings are arranged such that anodes and cathodes of the adjacent photovoltaic cell strings are opposite in direction to each other and the anode in an end portion of each photovoltaic cell string is connected to the cathode in an end portion of the adjacent photovoltaic cell string. In other words, the photovoltaic cells that are connected in series are placed to have a configuration in which the photovoltaic cell columns are folded into a predetermined number, that is, by photovoltaic cell string unit. In addition, in a case where the electric power generation operation point control circuit device illustrated in FIG. 7A is applied, it is difficult to connect in parallel a circuit element for photovoltaic cell electric power generation voltage regulation such as a capacitor and switching means as exemplified in the electric power generation operation point control circuit device to each photovoltaic cell unit. Accordingly, in an actual photovoltaic cell string, it is normally assumed that the unevenness in light reception amount attributable to a sunlight angle or a shadow or the like is within an allowable range (refer to FIG. 8B) and, in the photovoltaic cell string, the photovoltaic cells are connected in series as they are and the circuit elements (hereinafter, referred to as "voltage regulation circuit elements") are connected in parallel so that the electric power generation voltages of the respective photovoltaic cell strings are regulated.

SUMMARY

The photovoltaic cell string that has the strip-shaped structure as described above has a length of, for example, approximately 1 m in some cases between both ends thereof. As is drawn in FIG. 8C, when the wiring structure that is illustrated in FIG. 7A is realized in such photovoltaic cell strings, a cable (CA) is required to extend to be laid across both ends of the photovoltaic cell string with regard to each of the photovoltaic cell strings (PV1 to PV5) and the voltage regulation circuit elements are required to be connected in parallel. Then, a cable that has substantially the same length as the photovoltaic cell string is required, and thus the weight of the device increases and an electric power loss associated with the length of the cable ensues as well. In a case where, for example, the voltage regulation circuit element is simply connected in parallel between the adjacent anodes and cathodes of the two photovoltaic cell strings connected in series as is exemplified in FIG. 8D so that an increase in the length of the cable for connecting the voltage regulation circuit element in parallel with respect to the photovoltaic cell string is to be avoided, no individual voltage•current control can be performed in the two photovoltaic cell strings in a case where the two photovoltaic cell strings connected in series are subjected to the light reception amount unevenness (in a case where, for example, the photovoltaic cell strings are arranged on a curved roof as in FIG. 8B in a direction in which the roof is curved) and no current regulation control for an electric power generation operation at the respective maximum electric power points can be achieved even in a case where the maximum electric power points differ from each other.

In this regard, a novel circuit configuration has been found that is capable of performing an individual voltage•current control by photovoltaic cell string and significantly reducing the length of a cable for connecting voltage regulation circuit elements such as a capacitor and switching means in parallel to the photovoltaic cell string in a similar manner to the electric power generation operation point control circuit device described above.

The present disclosure provides an electric power generation operation point control circuit device that controls electric power generation operation points of individual photovoltaic cell strings in a photovoltaic cell module in which a plurality of photovoltaic cells are connected in series and has a circuit configuration with which a cable for connecting a voltage regulation circuit element in parallel to the photovoltaic cell string can be shortened.

An aspect of the present disclosure is an electric power generation operation point control circuit device including: a pair of output terminals formed by an anode-side output terminal and a cathode-side output terminal respectively connected to an anode-side end and a cathode-side end of a column of photovoltaic cell units in which N photovoltaic cell units are connected in series, N being an integer of at least three; an output voltage holding unit for holding a voltage between the pair of output terminals; a plurality of electrode connection terminals connected to respective electrode terminals of the photovoltaic cell units connected in series between the pair of output terminals; a first voltage holding unit group including a voltage holding unit for holding a voltage between an anode side of the (2k+1)th photovoltaic cell unit and a cathode side of the (2k+2)th photovoltaic cell unit by being connected in parallel via the electrode connection terminal for the anode side of the (2k+1)th photovoltaic cell unit and the cathode side of the (2k+2)th photovoltaic cell unit to each set of the (2k+1)th and (2k+2)th photovoltaic cell units connected in series to each other in the N photovoltaic cell units counted from the anode-side output terminal between the pair of output terminals, k being an integer ranging from zero to (N−3)/2 when the N is an odd number and an integer ranging from zero to (N−2)/2 when the N is an even number; and a second voltage holding unit group including a voltage holding unit for holding a voltage between an anode side of the (2k+2)th photovoltaic cell unit and a cathode side of the (2k+3)th photovoltaic cell unit by being connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units connected in series to each other in the N photovoltaic cell units counted from the anode-side output terminal between the pair of output terminals when the N is the odd number, k being an integer ranging from zero to (N−3)/2, and including a voltage holding unit for holding a voltage between the anode side of the (2k+2)th photovoltaic cell unit and the cathode side of the (2k+3)th photovoltaic cell unit by being connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units in the N photovoltaic cell units counted from the anode-side output terminal between the pair of output terminals, k being an integer ranging from zero to (N−4)/2, and a voltage holding unit for holding a voltage between the anode side and the cathode side of the N-th or first photovoltaic cell unit by being connected in parallel via the electrode connection terminal for the anode side and the cathode side of the N-th or first photovoltaic cell unit to the N-th or first photovoltaic cell unit when the N is the even number.

According to the aspect described above, the electric power generation voltages of the individual photovoltaic cell units in the photovoltaic cell module can be set substantially as desired based on regulation of the voltage between the output terminals (output voltage) and the voltage held by each voltage holding means of the first or second voltage holding means groups. Then, all the photovoltaic cell units can be operated at the respective maximum electric power points by the output voltage being held to become the total sum of the voltages at the respective maximum electric power points of the N photovoltaic cell units and the voltage of each voltage holding means being held to become the total sum of the voltages at the respective maximum electric power points of the photovoltaic cell units of the set of the photovoltaic cell units corresponding to the respective voltage holding means.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1A:
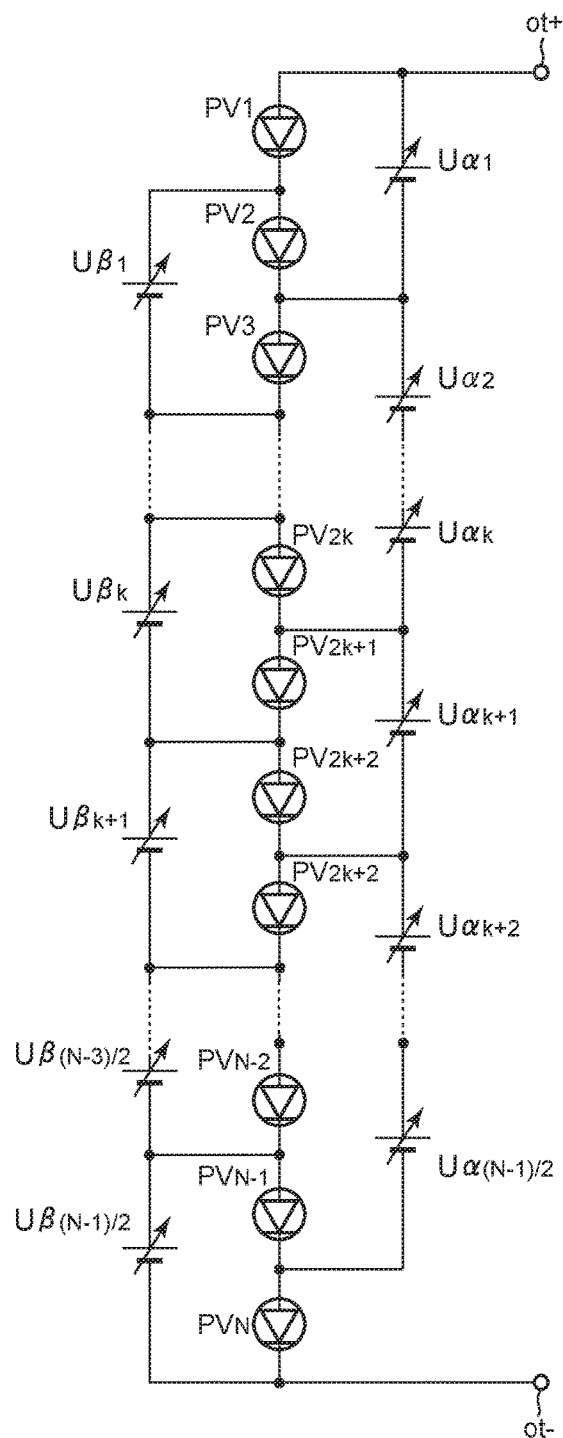
FIG. 1A is a diagram showing a circuit configuration principle of an electric power generation operation point control circuit device according to the present disclosure, in which a case where the number N of photovoltaic cell strings (units) is an odd number is shown.

Hereinafter, several embodiments will be described in detail with reference to accompanying drawings. In the drawings, the same reference numerals will be used to refer to the same regions.

Figure 6:
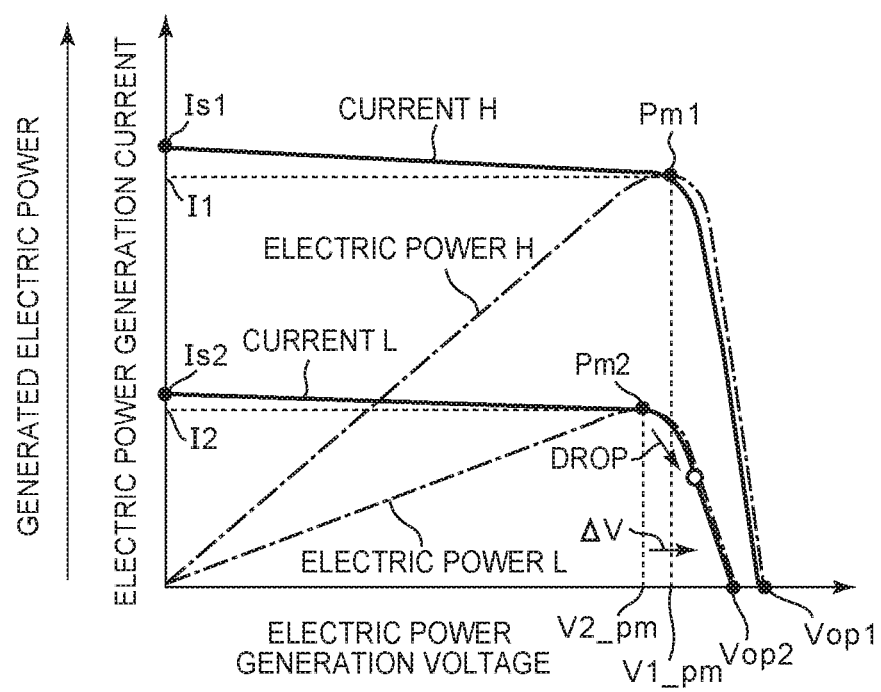
FIG. 6 is a characteristic diagram schematically showing changes in electric power generation current and generated electric power with respect to an electric power generation voltage of a photovoltaic cell.

Electric Power Generation Voltage Control of Electric Power Generation Operation Point Control Circuit Device According to Related Art (1) Circuit Configuration of Electric Power Generation Operation Point Control Circuit Device According to Related Art and Principle Thereof As described above, photovoltaic cells in general have a characteristic that a current (solid line) changes with respect to an electric power generation voltage as illustrated in FIG. 6. A maximum electric power point (Pm1, Pm2), at which electric power is maximized, is present in a change in generated electric power (one-dot chain line) of the photovoltaic cells in general. These current-voltage and electric power-voltage characteristics of the photovoltaic cell change depending on an environmental condition of the photovoltaic cell. When a light reception amount is reduced due to a change in sunlight angle, a shadow, or the like, a phenomenon occurs such as a phenomenon in which the characteristic curve illustrated in the form of the electric power H in the drawing is turned into the characteristic curve illustrated in the form of the electric power L in the drawing as a result of the characteristic curve illustrated in the form of the current H in the drawing being turned in a current-dropping direction into the characteristic curve illustrated in the form of the current L in the drawing.

In a case where photovoltaic cells that have the current-voltage characteristics described above are connected in series, a difference arises between the currents at the maximum electric power points once a deviation occurs between the current-voltage characteristic curves of the photovoltaic cells as a result of a difference between the light reception amounts. Accordingly, in the case of a configuration in which the same current flows through the photovoltaic cells that are connected in series, some of the photovoltaic cells become incapable of electric power generation at the maximum electric power point. Then, the electric power that is obtained in this state falls below a maximum electric power that is to be obtained in accordance with the light reception amount of all the photovoltaic cells. In this regard, an electric power generation operation point control circuit device to which a boosting chopper circuit is connected is used for each of the photovoltaic cells as exemplified in FIG. 7A such that all the photovoltaic cells are allowed perform an electric power generation operation at the respective maximum electric power points, in which the electric power generation voltage and the current are regulated for each of the photovoltaic cells.

Figure 7A:
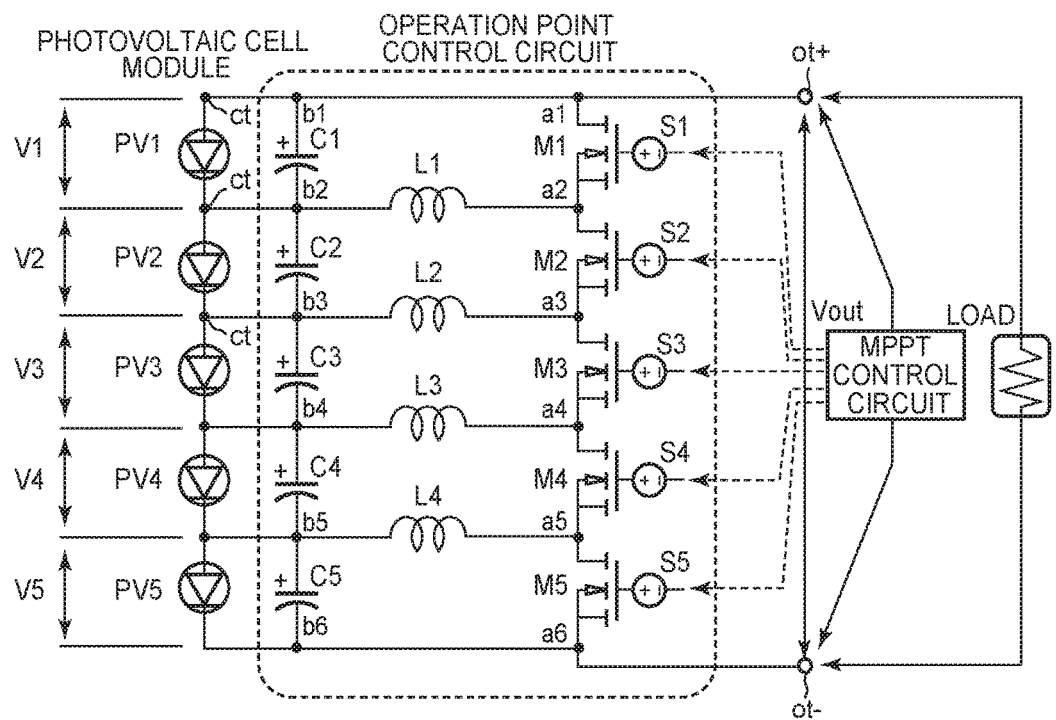
FIG. 7A is a diagram illustrating an example of a circuit configuration of an electric power generation operation point control circuit device according to the related art.
Figure 7B:
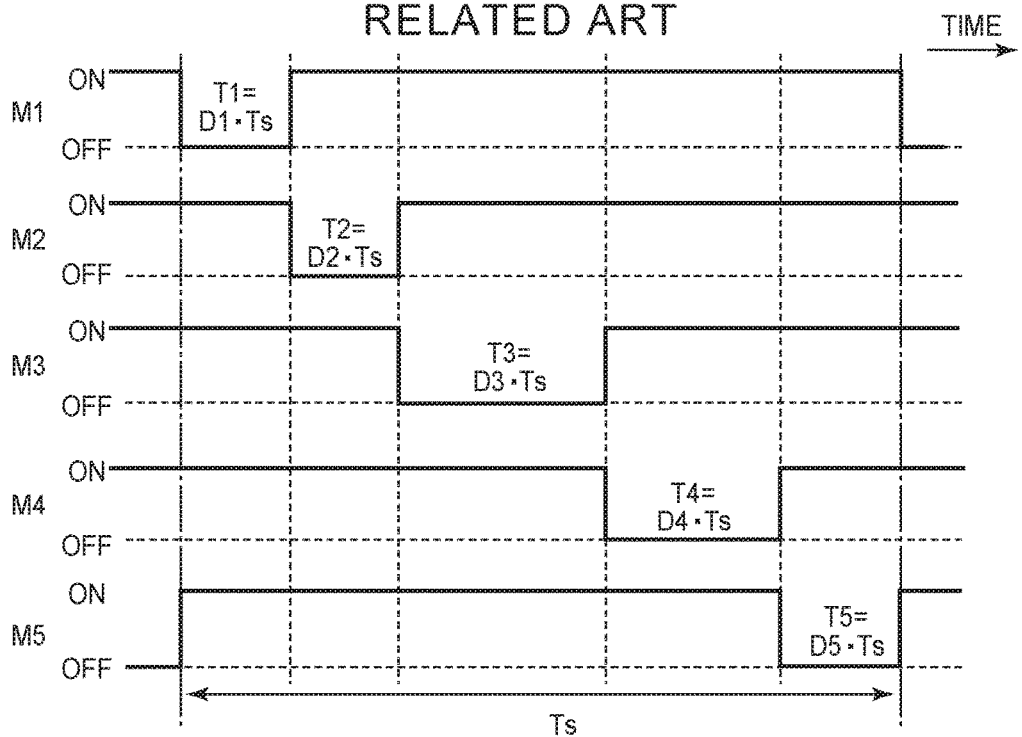
FIG. 7B is a diagram illustrating an exemplary time chart of an ON/OFF state of a switching element in the circuit that is illustrated in FIG. 7A.

Referring to FIG. 7A (although the number of the photovoltaic cells is five in the example that is illustrated in this drawing, the number of the photovoltaic cells may be any number that is equal to or greater than two), a voltage at both ends of photovoltaic cells PV1 to $PV_N$ that are connected in series, N being the number of the photovoltaic cells, that is, an output voltage of the electric power generation operation point control circuit device, is regulated by a load, an MPPT (maximum power point tracking) control circuit, or the like and respective electric power generation voltages V1 to $V_N$ of the photovoltaic cells PV1 to $PV_N$ are determined based on a time width ratio between ON states and OFF states, that is, conduction states and cut-off states, of switching elements (switching means) M1 to $M_N$ during an operation of the electric power generation operation point control circuit device described above. Then, as exemplified in FIG. 7B, switching between the ON states and the OFF states at a predetermined cycle Ts is performed on the switching elements M1 to $M_N$ and the switching elements M1 to $M_N$ are controlled such that the rest of the switching elements M1 to $M_N$ are put into the ON states when one of the switching elements M1 to $M_N$ is put into the OFF state. In this case, the following relationship is satisfied between the voltages V1 to $V_N$ of the photovoltaic cells and the output voltage Vout in the boosting chopper circuit as illustrated in the drawing by OFF time duty ratios D1 to $D_N$ (hereinafter, simply referred to as "duty ratios") being used, the duty ratio being the ratio of a time width of the OFF state of the switching element to the predetermined cycle Ts.

$$Vout = V1 + V2 + \ldots + V_N \qquad (1a)$$

$$V1 = D1 \cdot Vout \qquad (1b)$$

$$V2 = D2 \cdot Vout \qquad (1c)$$

$$\ldots$$

$$V_N = D_N \cdot Vout \qquad (1d)$$

In other words, D1+D2+ . . . +$D_N$ becomes equal to one. It should be noted that Vout and D1 to $D_N$ can be set to any values within ranges of allowable limits of the respective elements.

Accordingly, in the circuit that is illustrated in the drawing, each of all the photovoltaic cells is allowed to perform the electric power generation at the electric power generation voltage at the maximum electric power point and the maximum electric power that is to be obtained in accordance with the light reception amount of all the photovoltaic cells is obtained once the output voltage Vout is held such that the output voltage Vout becomes equal to the total sum of the electric power generation voltages at the maximum electric power points of all the photovoltaic cells, that is, such that $$Vout = V1\_pm + V2\_pm + \ldots + V_N pm \qquad (2a)$$

is satisfied (V1_pm, V2_pm, $V_N$_pm being the electric power generation voltages at the respective maximum electric power points of the photovoltaic cells) and the duty ratios D to $D_N$ are regulated such that the following is satisfied.

$$D1 = V1\_pm / Vout \qquad (2b)$$

$$D2 = V2\_pm / Vout \qquad (2c)$$

$$\ldots$$

$$D_N = V_N\_pm / Vout \qquad (2d)$$

In the circuit configuration described above, a capacitor C, and inductor L, and the switching element (switching means) M that are connected to each photovoltaic cell are voltage regulation circuit elements and these are voltage holding means for holding the voltage of each photovoltaic cell based on the output voltage. In the voltage holding means that has the configuration described above, a current difference between photovoltaic cells flows bypassing the switching element M regarding the respective currents flowing through the photovoltaic cells such that the photovoltaic cell reaches a desired voltage (typically, voltage at the maximum electric power point). Regarding actual setting of the values of Vout and D1 to $D_N$ in the circuit described above, the generated electric power is measured by the MPPT control circuit monitoring the voltage and the current between output terminals while changing Vout and D1 to $D_N$ and conditions of Vout and D1 to $D_N$ giving the maximum electric power are searched for and used.

Figure 8A:
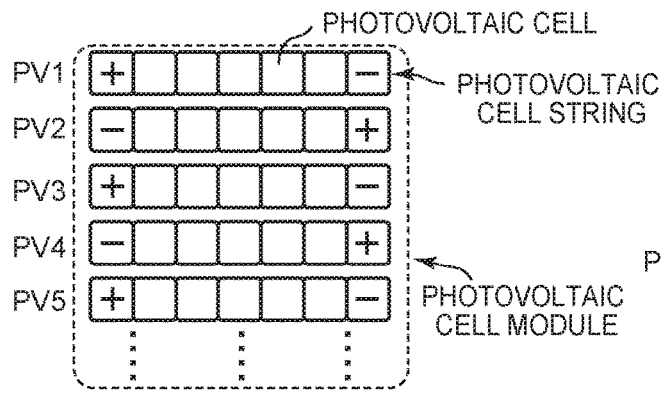
FIG. 8A is a schematic plan view of the photovoltaic cell module in which the N photovoltaic cell strings that are connected in series are arranged along the direction which is perpendicular to the longitudinal direction of the photovoltaic cell string such that the anodes and the cathodes of the adjacent photovoltaic cell strings are opposite in direction to each other.
Figure 8B:
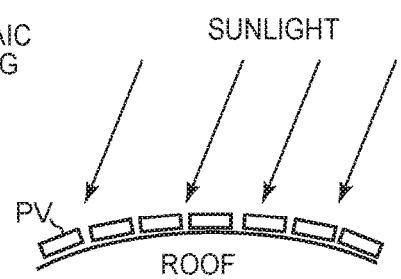
FIG. 8B is a schematic side view of a case where the photovoltaic cell module that is illustrated in FIG. 8A is placed on a structure such as a curved roof.

(2) Aspect of Implementation of Electric Power Generation Operation Point Control Circuit Device According to Related Art In the case of installation of an electric power generation apparatus or an electric power generation facility based on the photovoltaic cell module that is formed by the photovoltaic cells which are connected in series as described above, the photovoltaic cell module is normally configured to be in a state where photovoltaic cell strings in which the plurality of photovoltaic cells connected in series are aligned in a strip shape are arranged along a direction which is perpendicular to a longitudinal direction of the photovoltaic cell string and such that anodes ("+" ends in the drawing) and cathodes ("−" ends in the drawing) are opposite in direction to each other with respect to the adjacent photovoltaic cell strings as is schematically drawn in FIG. 8A. The number of components of the voltage regulation circuit element increases once the voltage holding means as described above is connected to each photovoltaic cell when the electric power generation operation point control circuit device described above is applied in the photovoltaic cell module that has this configuration. In the photovoltaic cell string in which the plurality of photovoltaic cells are arranged in a line, meanwhile, it is normally assumed that an unevenness in light reception amount is within an allowable range. In a case where, for example, the photovoltaic cell module is placed on a curved roof of a vehicle as is exemplified in FIG. 8B, no significant unevenness arises between the light reception amounts of the respective cells in the individual photovoltaic cell strings, although this depends on sunlight orientation, and thus it is assumed that the maximum electric power points of the respective cells substantially correspond to each other as well. Accordingly, in a case where the electric power generation operation point control circuit device is applied to the photovoltaic cell module as illustrated in the drawing, a configuration as illustrated in FIG. 8C in which the voltage holding means as described above is connected to each of the photovoltaic cell strings with the photovoltaic cell string being regarded as a unit (as a photovoltaic cell unit) is adopted.

Figure 8C:
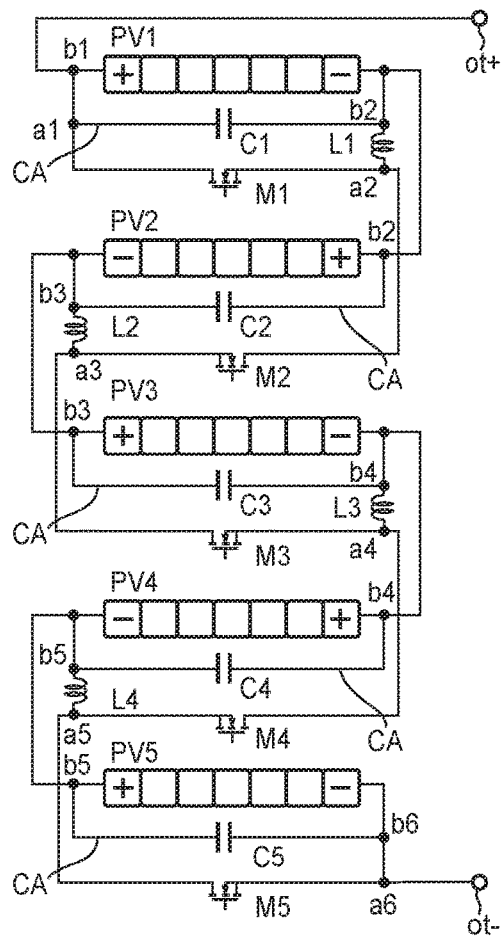
FIG. 8C is a diagram schematically illustrating the voltage regulation circuit element and cable placement in a case where the circuit configuration of the electric power generation operation point control circuit device that is illustrated in FIG. 7A is applied to the photovoltaic cell module that is illustrated in FIG. 8A.
Figure 8D:
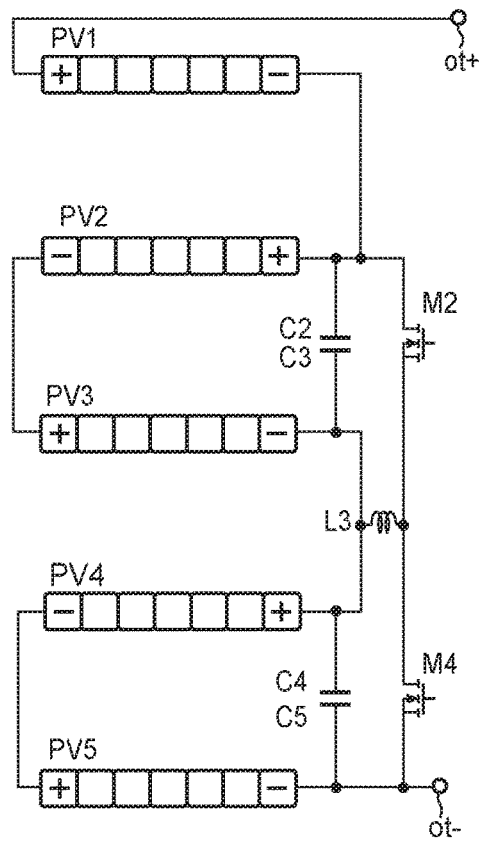
FIG. 8D is a diagram schematically illustrating the voltage regulation circuit element and cable placement in a case where a voltage regulation circuit element is connected to only one side of the photovoltaic cell module in the photovoltaic cell module that is illustrated in FIG. 8A.

In a case where the voltage regulation circuit element such as the capacitor and the switching element is connected in parallel to the strip-shaped photovoltaic cell string (between the output terminals), however, a cable CA covering an entire length of the photovoltaic cell string in length becomes essential as illustrated in FIG. 8C. In addition, in the case of the circuit configuration that is illustrated in FIG. 7A, a total cable amount that is required might become relatively large because the voltage regulation circuit elements are connected in parallel to all the photovoltaic cell strings of the photovoltaic cell module. In a configuration in which the voltage regulation circuit element is connected to only one end of the photovoltaic cell module as illustrated in FIG. 8D so that the length of the cable is reduced, for example, one voltage holding means is connected to two photovoltaic cell strings, and thus a common current has to flow through the two photovoltaic cell strings that are connected to each voltage holding means. Then, it becomes difficult for the respective photovoltaic cell strings to perform the electric power generation operation at the maximum electric power points when the maximum electric power points deviate from each other due to, for example, a difference between the light reception amounts of the two photovoltaic cell strings.

Principle and Configuration of Electric Power Generation Voltage Control of Electric Power Generation Operation Point Control Circuit Device According to Present Disclosure (1) Circuit Configuration of Electric Power Generation Operation Point Control Circuit Device According to Present Disclosure and Operation Principle Thereof The present disclosure provides an electric power generation operation point control circuit device that uses a novel circuit configuration which differs from the circuit configuration of the electric power generation operation point control circuit device according to the related art. According to this electric power generation operation point control circuit device, the cables for voltage regulation circuit element connection do not have to be laid across the entire lengths of the photovoltaic cell strings (except for the photovoltaic cell string that is connected to the end of the photovoltaic cell module) when the voltage regulation circuit elements are connected to the photovoltaic cell strings in a case where the device is applied to the photovoltaic cell module that is configured to be in the state where the plurality of strip-shaped photovoltaic cell strings are arranged in the direction which is perpendicular to the longitudinal direction of the photovoltaic cell string and such that the anodes and the cathodes are opposite in direction to each other with respect to the adjacent photovoltaic cell strings. Accordingly, the total cable amount that is required can be significantly reduced.

Figure 1B:
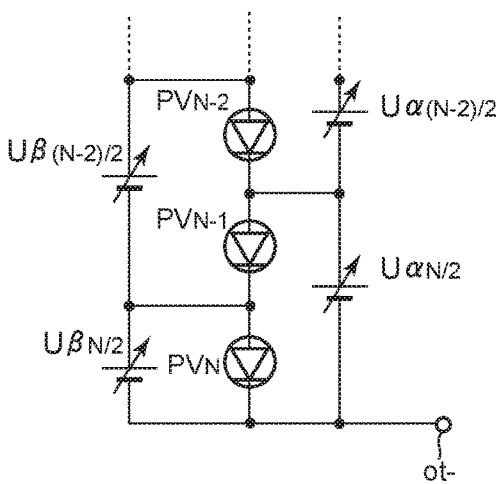
FIG. 1B is a diagram showing the circuit configuration principle of the electric power generation operation point control circuit device according to the present disclosure, in which a circuit part of the N-th photovoltaic cell string (unit) in a case where the number N of the photovoltaic cell strings (units) is an even number is illustrated.

Referring to FIG. 1A, in a case where the N photovoltaic cell strings PV1 to $PV_N$ that are connected in series are present (as the photovoltaic cell units) and both ends thereof are connected to the output terminals (ot+, ot−) in the circuit configuration of the electric power generation operation point control circuit device according to the present disclosure, the voltage holding means are not disposed on a one-to-one basis with respect to the individual photovoltaic cell strings in short and, as illustrated in the drawing, a group of voltage holding means Uαi (first voltage holding means group) connected to every two photovoltaic cell strings in order from the first photovoltaic cell string (PV1) counted from the anode-side ot+(or the cathode-side ot−) of the N photovoltaic cell strings and a group of voltage holding means Uβi (second voltage holding means group) connected to every two photovoltaic cell strings in order from the second photovoltaic cell string PV2 counted from the anode-side ot+(or the cathode-side ot−) of the N photovoltaic cell strings are disposed (i being a positive integer). When N is an even number, no photovoltaic cell string is combined with the N-th photovoltaic cell string in the group of the voltage holding means up connected in order from the second photovoltaic cell string PV2 as illustrated in FIG. 1B, and thus the voltage holding means $Uβ_{N/2}$ is disposed for the N-th photovoltaic cell string alone (in this case, the photovoltaic cell string that the voltage holding means Uβ is disposed for alone may be the first photovoltaic cell string). In other words, in the N photovoltaic cell strings, the voltage holding means that are connected to every two photovoltaic cell strings are connected in an alternate order.

In other words, when N is an odd number, the circuit configuration of the electric power generation operation point control circuit device according to the present disclosure has a first voltage holding means group and a second voltage holding means group between a pair of the output terminals (ot+, ot−), the voltage holding means $Uα_{(k+1)}$ constituting the first voltage holding means group and the voltage holding means $Uα_{(k+1)}$ being for holding the voltage $V_{2k+1}+V_{2k+2}$ between the anode side of the (2k+1)th photovoltaic cell string and the cathode side of the (2k+2)th photovoltaic cell string by being connected in parallel via an electrode connection terminal for the anode side of the (2k+1)th photovoltaic cell string and the cathode side of the (2k+2)th photovoltaic cell string to each set of the (2k+1)th and (2k+2)th photovoltaic cell strings in the N photovoltaic cell strings PV1 to $PV_N$ which are connected in series to each other counted from the anode-side output terminal ot+ (k being an integer ranging from zero to (N−3)/2) and the voltage holding means $Uβ_{(k+1)}$ constituting the second voltage holding means group and the voltage holding means $Uβ_{(k+1)}$ being for holding the voltage $V_{2k+2}+V_{2k+3}$ between the anode side of the (2k+2)th photovoltaic cell string and the cathode side of the (2k+3)th photovoltaic cell string by being connected in parallel via an electrode connection terminal for the anode side of the (2k+2)th photovoltaic cell string and the cathode side of the (2k+3)th photovoltaic cell string to each set of the (2k+2)th and (2k+3)th photovoltaic cell strings in the N photovoltaic cell strings PV1 to $PV_N$ which are connected in series to each other counted from the anode-side output terminal ot+.

In addition, when N is an even number, the circuit configuration of the electric power generation operation point control circuit device according to the present disclosure has a first voltage holding means group and a second voltage holding means group between the pair of output terminals (ot+, ot−), the voltage holding means $Uα_{(k+1)}$ constituting the first voltage holding means group and the voltage holding means $Uα_{(k+1)}$ being for holding the voltage $V_{2k+1}+V_{2k+2}$ between the anode side of the (2k+1)th photovoltaic cell string and the cathode side of the (2k+2)th photovoltaic cell string by being connected in parallel via an electrode connection terminal for the anode side of the (2k+1)th photovoltaic cell string and the cathode side of the (2k+2)th photovoltaic cell string to each set of the (2k+1)th and (2k+2)th photovoltaic cell strings in the N photovoltaic cell strings PV1 to $PV_N$ which are connected in series to each other counted from the anode-side output terminal ot+(k being an integer ranging from zero to (N−2)/2), the voltage holding means $U\beta_{k+1}$ and the voltage holding means $U\beta_{N/2}$ (or $U\beta_0$) constituting the second voltage holding means group, the voltage holding means $U\beta_{k+1}$ being for holding the voltage $V_{2k+2}+V_{2k+3}$ between the anode side of the (2k+2)th photovoltaic cell string and the cathode side of the (2k+3)th photovoltaic cell string by being connected in parallel via an electrode connection terminal for the anode side of the (2k+2)th photovoltaic cell string and the cathode side of the (2k+3)th photovoltaic cell string to each set of the (2k+2)th and (2k+3)th photovoltaic cell strings in the N photovoltaic cell strings PV1 to $PV_N$ which are connected in series to each other counted from the anode-side output terminal ot+(k being an integer ranging from zero to (N−4)/2), and the voltage holding means $U\beta_{N/2}$ (or $U\beta_0$) being for holding the voltage $V_N$ (or $V_1$) between the anode side and the cathode side of the N-th (or first) photovoltaic cell string $PV_N$ (or $PV_1$) by being connected in parallel via an electrode connection terminal for the anode side and the cathode side of the N-th (or first) photovoltaic cell string $PV_N$ (or $PV_1$) to the N-th (or first) photovoltaic cell string $PV_N$ (or $PV_1$).

In the circuit configuration described above, the respective voltages V1 to $V_N$ of the photovoltaic cell strings PV1 to $PV_N$ can be uniquely controlled by the output voltage Vout between the output terminals (ot+, ot−) being controlled along with holding voltages $V\alpha 1$ to $V\alpha_{N-1/2}$, $V\beta 1$ to $V\beta_{N/2}$ of the voltage holding means $U\alpha 1$ to $U\alpha_{N-1/2}$, $U\beta 1$ to $U\beta_{N-1/2}$ when N is an odd number and holding voltages $V\alpha 1$ to $V\alpha_{N/2}$, $V\beta 1$ to $V\beta_{N/2}$ of the voltage holding means $V\alpha 1$ to $U\alpha_{N-1/2}$, $U\beta 1$ to $U\beta_{N/2}$ when N is an even number.

To be more specific with regard to controlling the respective voltages V1 to $V_N$ of the photovoltaic cell strings PV1 to $PV_N$, the voltage V1 of the photovoltaic cell string PV1 is given by $$V1 = V\text{out} - \Sigma V\beta i \tag{1}$$

$\Sigma U\beta i$ in (1) is the total sum of the holding voltages of the voltage holding means UN of the second voltage holding means group. In addition, the following recurrence formulae are satisfied regarding the voltages $V_{2k+1}$, $V_{2k+2}$, $V_{2K+3}$ of the photovoltaic cell strings $PV_{2k+1}$, $PV_{2k+2}$, $PV_{2K+3}$ (=$PV_{2(k+1)+1}$).

$$V_{2k+1} = V\alpha_{(k+1)} - V_{2k+1} \tag{2}$$

$$V_{2K+3} = V\beta_{(k+1)} - V_{2k+2} \tag{3}$$

Accordingly, all the respective voltages V1 to $V_N$ of the photovoltaic cell strings PV1 to $PV_N$ are uniquely determined by recurrence formulae (2) and (3) being solved with Equation (1) being regarded as an initial value at a time when k is zero. Accordingly, the voltages $V_{2k+1}$, $V_{2k+2}$ of the photovoltaic cell strings $PV_{2k+1}$, $PV_{2k+2}$ are given by the following equations.

$$V_{2k+1} = V\text{out} - \Sigma V\alpha i - \Sigma V\beta j \tag{4}$$

$$V_{2k+2} = \Sigma V\alpha 1 + \Sigma V\beta j - V\text{out} \tag{5}$$

In (4) and (5), is a total sum, i is an integer ranging from one to k, l is an integer ranging from one to k+1, and j is an integer ranging from k+1 to (N−1)/2 when N is an odd number and an integer ranging from k+1 to N/2 when N is an even number. Equations (4) and (5) are satisfied both when N is an odd number and when N is an even number (The number of the voltages V1 to $V_N$ of the photovoltaic cell strings PV1 to $PV_N$ as control targets is N, and the number of the input variables Vout, $V\alpha i$, $V\beta i$ for the control is 1+(N−1)/2+(N−1)/2=N when N is an odd number. When N is an even number, the number of the variables Vout, $V\alpha i$, $V\beta i$ becomes 1+N/2+N/2=N+1, but the number of the input variables for the control is N because Vout=$\Sigma V\alpha i$ is satisfied).

Figure 2A:
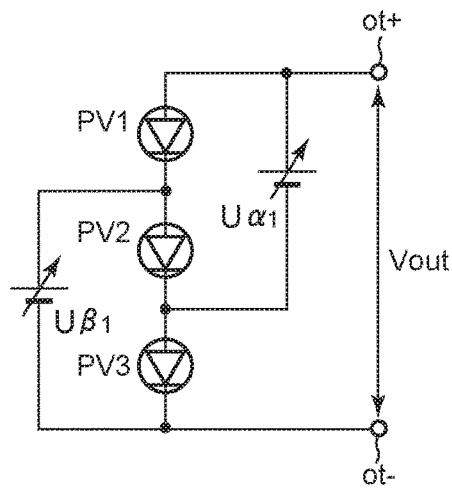
FIG. 2A is a diagram showing a circuit configuration of the electric power generation operation point control circuit device according to the present disclosure in a case where the number N of the photovoltaic cell strings (units) is three.
Figure 2B:
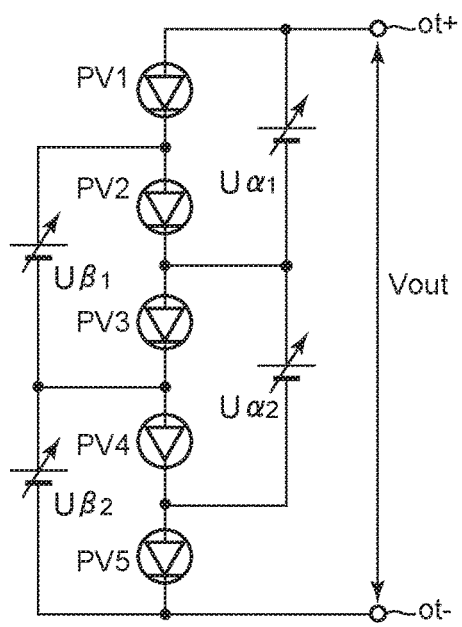
FIG. 2B is a diagram showing the circuit configuration of the electric power generation operation point control circuit device according to the present disclosure in a case where the number N of the photovoltaic cell strings (units) is five.
Figure 2C:
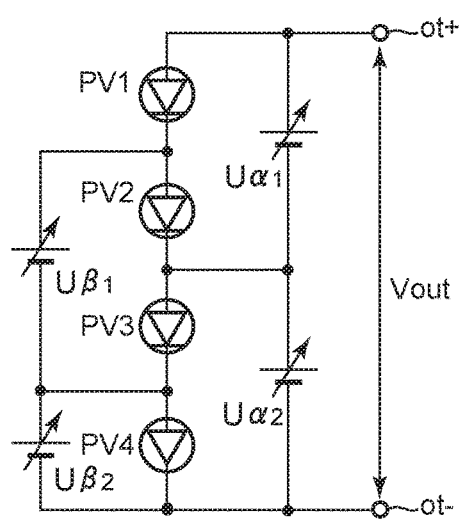
FIG. 2C is a diagram showing the circuit configuration of the electric power generation operation point control circuit device according to the present disclosure in a case where the number N of the photovoltaic cell strings (units) is four.
Figure 2D:
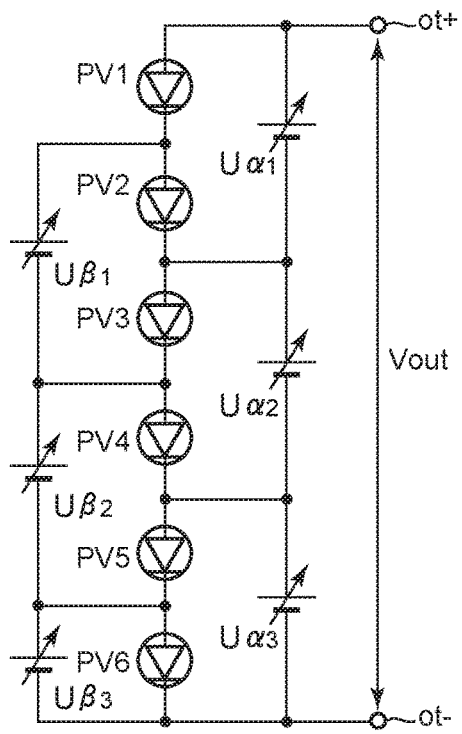
FIG. 2D is a diagram showing the circuit configuration of the electric power generation operation point control circuit device according to the present disclosure in a case where the number N of the photovoltaic cell strings (units) is six.

As a specific example, when N is three (FIG. 2A), $$V1 = V\text{out} - V\beta 1$$

$$V2 = V\alpha 1 + V\beta 1 - V\text{out}$$

$$V3 = V\text{out} - V\alpha 1$$

are satisfied. When N is five (FIG. 2B), $$V1 = V\text{out} - V1 - V\beta 2$$

$$V2 = V\alpha 1 + V\beta 2 + V\beta 1 - V\text{out}$$

$$V3 = V\text{out} - V\beta 2 - V\alpha 1$$

$$V4 = V\alpha 2 + V\alpha 1 + V\beta 2 - V\text{out}$$

$$V5 = V\text{out} - V\alpha 1 - V\alpha 2$$

are satisfied. When N is four (FIG. 2C), $$V1 = V\text{out} - V\beta 1$$

$$V2 = V\alpha 1 + V\beta 1 - V\text{out}$$

$$V3 = V\text{out} - V\beta 2 - V\alpha 1$$

$$V4 = V\beta 2(V\text{out} = V\alpha 2 + V\alpha 1)$$

are satisfied. When N is six (FIG. 2D), $$V1 = V\text{out} - V\beta 1 - V\beta 2 - V\beta 3$$

$$V2 = V\alpha 1 + V\beta 1 + V\beta 2 + V\beta 3 - V\text{out}$$

$$V3 = V\text{out} - V\alpha 1 - V\alpha 2 - V\beta 2 - V\beta 3$$

$$V4 = V\alpha 2 + V\alpha 1 + V\beta 2 + V\beta 3 - V\text{out}$$

$$V5 = V\text{out} - V\alpha 2 + V\alpha 1 - V\beta 3$$

$$V6 = V\beta 3(V\text{out} = V\alpha 3 + V\alpha 2 + V\alpha 1)$$

are satisfied.

In the above description, the electric power generation operation of all the photovoltaic cell strings PV1 to $PV_N$ at the voltages VM1 to $VM_N$ at the respective maximum electric power points is achieved by Vout, $V\alpha i$, $V\beta i$ being respectively set as follows.

$$V\text{out} = \Sigma V M i \tag{6}$$

$$V\alpha_{(k+1)} = VM_{2k+2} + VM_{2k+1} \tag{7}$$

$$V\beta_{(k+1)} = VM_{2K+3} + VM_{2k+2} \tag{8}$$

The values of the voltages VM1 to $VM_N$ can be determined by any method.

Configuration and Operation of Embodiment of Electric Power Generation Operation Point Control Circuit Device According to Present Disclosure In the configuration according to the present disclosure described above, the output voltage Vout between the output terminals and the holding voltages $V\alpha i$, $V\beta i$ of the respective voltage holding means $U\alpha i$, $U\beta i$ may be given by any form. For example, the output voltage Vout may be set by a voltage of an MPPT controller or the like or a current controller, the MPPT controller executing maximum electric power point tracking (maximum power point tracking: MPPT). The voltage holding means for holding the respective holding voltages $V\alpha i$, $V\beta i$ as described above are means for regulating the amount of the current flowing through the photovoltaic cell unit or a set of the photovoltaic cell units connected such that the voltage of the photovoltaic cell unit or the photovoltaic cell unit set becomes a voltage that is to be held. The voltage holding means may be realized with the boosting chopper circuit based on the voltage regulation circuit element such as the capacitor, the inductor, and the switching means (semiconductor device) as is exemplified in the related art. Alternatively, the voltage holding means may be realized by a DC-DC converter that uses a transformer being used.

Figure 3A:
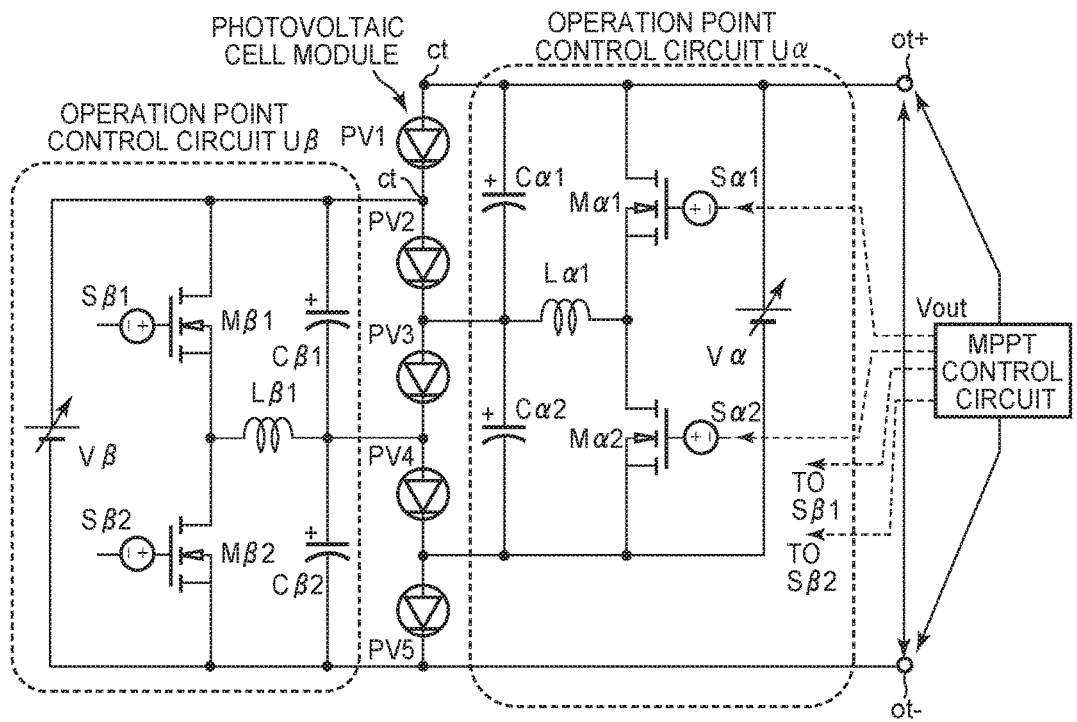
FIG. 3A is an exemplary circuit configuration diagram of an embodiment of the electric power generation operation point control circuit device according to the present disclosure.

FIG. 3A shows a circuit configuration in a case where the electric power generation operation point control circuit device according to the present disclosure in which the voltage holding means U$\alpha$i, U$\beta$i are realized by a multi-stage boosting chopper circuit is applied to the photovoltaic cell module in which the five photovoltaic cell strings (photovoltaic cell units) PV1 to PV5 are connected in series. Referring to this drawing, in this configuration, the capacitors C$\alpha$1, C$\alpha$2 and the switching means M$\alpha$1, M$\alpha$2 are connected in parallel to the set of the photovoltaic cell strings PV1, PV2 and the set of the photovoltaic cell strings PV3, PV4 and the capacitors C$\beta$1, C$\beta$2 and the switching means M$\beta$1, M$\beta$2 are connected in parallel to the set of the photovoltaic cell strings PV2, PV3 and the set of the photovoltaic cell strings PV4, PV5 first between the pair of output terminals ot+, ot−. The inductors L$\alpha$1, L$\beta$1 are charged as illustrated in the drawing between the capacitors and the switching means. Typically, each of the switching means M$\alpha$1, M$\alpha$2, M$\beta$1, M$\beta$2 may be a switching element such as a MOSFET that is used in an electric power generation operation point control circuit device for a normal photovoltaic cell. The switching elements M$\alpha$1, M$\alpha$2, M$\beta$1, M$\beta$2 have control inputs S$\alpha$1, S$\alpha$2, S$\beta$1, S$\beta$2, respectively. The switching elements M$\alpha$1, M$\alpha$2, M$\beta$1, M$\beta$2 selectively perform conduction and cut-off between upper and lower terminals illustrated in the drawing, that is, between terminals at both ends of the corresponding photovoltaic cell string set and capacitor connected in parallel in response to the control input in a manner which will be described later. The capacitor and the inductor may be any capacitor and inductor that are in common use in this field.

In addition, in the case of the circuit configuration according to the present disclosure that is illustrated in the drawing, the variable voltage source V$\alpha$ and the variable voltage source V$\beta$ are connected to both ends of the switching elements M$\alpha$1, M$\alpha$2 and both ends of the switching elements M$\beta$1, M$\beta$2, respectively (parallel application type). These variable voltage sources may be voltage sources of any type allowing the voltage to be regulated as desired. For example, these variable voltage sources may be floating electric power sources. The respective voltages applied by the variable voltage source V$\alpha$ and the variable voltage source V$\beta$ are regulated to become the voltages that should be held in the photovoltaic cell strings which are connected between both ends of the switching elements M$\alpha$1, M$\alpha$2 and between both ends of the switching elements M$\beta$1, M$\beta$2, that is, the total sum of the electric power generation voltages to be realized in the photovoltaic cell strings.

In the above-described configuration that is illustrated in FIG. 3A, a voltage that is set by the voltage of the MPPT controller or the like or the current controller as before is given between the output terminals. In addition, the capacitor and the switching element that are connected in parallel to each set of the two photovoltaic cell strings and the inductor that is charged therebetween function as the voltage holding means U$\alpha$i, U$\beta$i corresponding to the two sets of the photovoltaic cell strings. The group of the voltage holding means U$\alpha$i connected to the right side of the photovoltaic cell string in the drawing that includes the variable voltage source V$\alpha$ is the first voltage holding means group and the group of the voltage holding means U$\beta$i connected to the left side of the photovoltaic cell string in the drawing that includes the variable voltage source V$\beta$ is the second voltage holding means group.

Figure 3B:
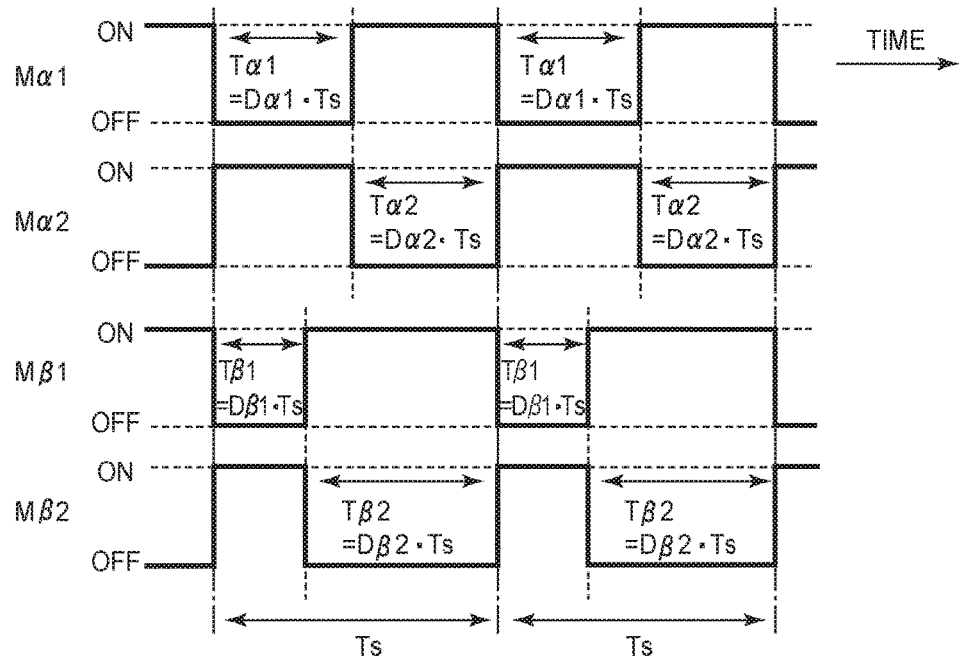
FIG. 3B is a diagram illustrating an exemplary time chart of an ON/OFF state of a switching element.

During an operation of the circuit described above, a control signal (ON/OFF) is given so that the conduction and cut-off are executed in an alternating manner, that is, so that a chopper operation is executed, with respect to the control inputs S$\alpha$1, S$\alpha$2, S$\beta$1, S$\beta$2 of the switching elements M$\alpha$1, M$\alpha$2, M$\beta$1, M$\beta$2 as is exemplified in FIG. 3B. At this time, the control signal is controlled such that the switching between the ON states and the OFF states at the predetermined cycle Ts is performed on the switching elements belonging to the respective groups and the rest of the switching elements is put into the ON state when one of the switching elements is put into the OFF state in each of the first voltage holding means group and the second voltage holding means group and the respective voltages Vi of the photovoltaic cell string sets are determined based on voltages VT$\alpha$, VT$\beta$ of the variable voltage sources V$\alpha$, V$\beta$ and OFF time duty ratios D$\alpha$i, D$\beta$i (hereinafter, simply referred to as "duty ratios") that are the ratios of the time widths T$\alpha$i, T$\beta$i of the OFF states of the respective switching elements to the predetermined cycle Ts. Specifically, in the first voltage holding means group and the second voltage holding means group, the following relational expressions are satisfied between the voltages Vi (chopper circuit input side) of the respective photovoltaic cell string sets and the voltages VT$\alpha$, VT$\beta$ (chopper circuit output side) of the variable voltage sources by the OFF time duty ratios D$\alpha$i, D$\beta$i being used, respectively.

First voltage holding means group side:

$$V\alpha 1 = D\alpha 1 \cdot VT\alpha \quad (9a)$$

$$V\alpha 2 = D\alpha 2 \cdot VT\alpha \quad (9b)$$

In (9a) and (9b), VT$\alpha$=V$\alpha$1+V$\alpha$2 and D$\alpha$1+D$\alpha$2=1 are satisfied.

Second voltage holding means group side:

$$V\beta 1 = D\beta 1 \cdot VT\beta \quad (9c)$$

$$V\beta 2 = D\beta 2 \cdot VT\beta \quad (9d)$$

In (9c) and (9d), VT$\beta$=Vf$\beta$1+V$\beta$2 and D$\beta$1+D$\beta$2=1 are satisfied. Accordingly, $$V\alpha 1 = V1 + V2; V\alpha 2 = V3 + V4;$$

$$V\beta 1 = V2 + V3; V\beta 2 = V4 + V5$$

are satisfied by VT$\alpha$, VT$\beta$ being respectively set as $$VT\alpha = V1 + V2 + V3 + V4$$

$$VT\beta = V2 + V3 + V4 + V5$$

and the duty ratios D$\alpha$i, D$\beta$i being set as $$D\alpha 1 = (V1 + V2)/(V1 + V2 + V3 + V4)$$

$$D\alpha 2 = (V3 + V4)/(V1 + V2 + V3 + V4)$$

$$D\beta 1 = (V2 + V3)/(V2 + V3 + V4 + V5)$$

$$D\beta 2 = (V4 + V5)/(V2 + V3 + V4 + V5)$$

with regard to the voltages V1 to V5 to be held in the respective photovoltaic cell strings and the respective boosting chopper circuits that are formed by the capacitors, the inductors, and the switching elements which are connected to the photovoltaic cell string sets constitute the voltage holding means U$\alpha$i, U$\beta$i giving the holding voltages V$\alpha$i, V$\beta$i for the corresponding photovoltaic cell string sets by referring to the voltages of the variable voltage sources, respectively. Setting of each of Vout, VT$\alpha$, VT$\beta$, D$\alpha$1, D$\alpha$2, D$\beta$1, D$\beta$2 as follows at a time of the voltages VM1 to VM5 at the maximum electric power points of the respective photovoltaic cell strings causes the voltage at the maximum electric power point to be held in each photovoltaic cell string based on Equations (4), (5), and (9a) to (9d). In this manner, all the photovoltaic cell strings can be allowed to perform the electric power generation operation at the maximum electric power points.

$$Vout = VM1 + VM2 + VM3 + VM4 + VM5$$

$$VT\alpha = VM1 + VM2 + VM3 + VM4$$

$$VT\beta = VM2 + VM3 + VM4 + VM5$$

$$D\alpha 1 = (VM1 + VM2)/(VM1 + VM2 + VM3 + VM4)$$

$$D\alpha 2 = (VM3 + VM4)/(VM1 + VM2 + VM3 + VM4)$$

$$D\beta 1 = (VM2 + VM3)/(VM2 + VM3 + VM4 + VM5)$$

$$D\beta 2 = (VM4 + VM5)/(VM2 + VM3 + VM4 + VM5)$$

During actual setting of the values of Vout, VT$\alpha$, VT$\beta$, D$\alpha$1, D$\alpha$2, D$\beta$2 in the circuit described above, the MPPT control circuit measures the generated electric power by monitoring the voltage and the current between the output terminals while changing Vout, VT$\alpha$, VT$\beta$, D$\alpha$1, D$\alpha$2, D$\beta$2 and the condition giving the maximum electric power is searched for and used.

The example of the circuit described above shows a case where the number of the photovoltaic cell strings is five. When the number N of the photovoltaic cell strings is four or more, the voltage holding means U$\alpha$i, U$\beta$i are configured by the capacitor, the switching element, the inductor, and the variable voltage source being used in a similar manner to the above. In a case where the number N of the photovoltaic cell strings is an even number, the total sum VT$\alpha$ of the voltages of the voltage holding means U$\alpha$i corresponds to the output voltage Vout, and thus the variable voltage source V$\alpha$ may not be separately disposed. In other words, in a case where N is an even number, the function of the variable voltage source V$\alpha$, that is, the holding of VT$\alpha$, is achieved by the main voltage holding means. When the number N of the photovoltaic cell strings is three, the function is achieved by connection of the variable voltage source V$\alpha$ applying V1+V2 and V$\beta$ applying V2+V3.

Figure 4:
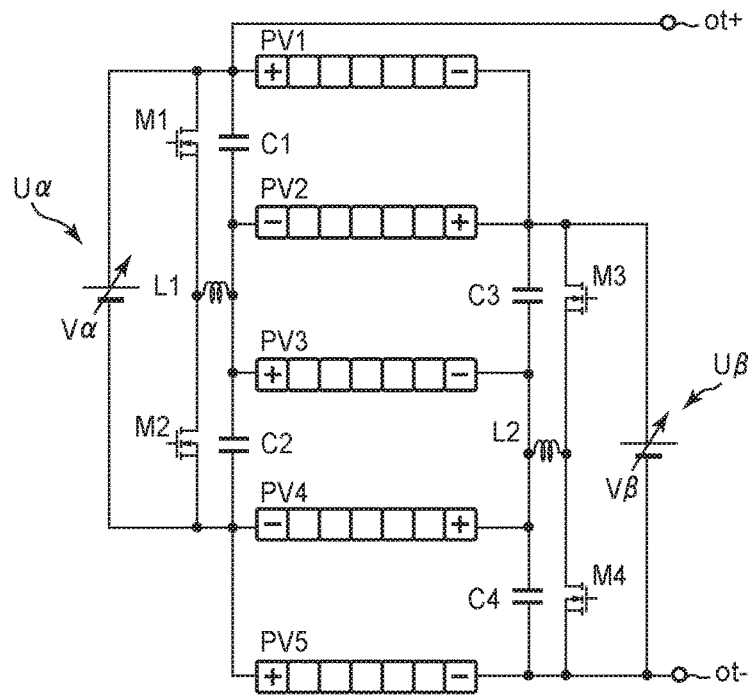
FIG. 4 is a diagram schematically illustrating a case of a voltage regulation circuit element and cable placement that is applied to a case where the N photovoltaic cell strings which are the circuit configurations illustrated in FIG. 3A connected in series in a photovoltaic cell module are arranged along a direction that is perpendicular to a longitudinal direction of the photovoltaic cell string such that anodes and cathodes of the adjacent photovoltaic cell strings are opposite in direction to each other.

FIG. 4 is a diagram schematically illustrating a voltage regulation circuit element placement in a case where the circuit that has the configuration which is illustrated in FIG. 3A is applied to the photovoltaic cell module in which the photovoltaic cell strings are arranged along the direction perpendicular to the longitudinal direction of the photovoltaic cell string and such that the anodes ("+" ends in the drawing) and the cathodes ("−" ends in the drawing) are opposite in direction to each other with respect to the adjacent photovoltaic cell strings as is exemplified in FIG. 8A. As is apparent from a comparison between the placement in this drawing and a voltage regulation circuit element placement of the prior electric power generation operation point control device that is exemplified in FIG. 8C, in the case of the circuit of the device according to the present disclosure, each of the circuit element of the voltage holding means U$\alpha$ of the first voltage holding means group and the circuit element of the voltage holding means U$\beta$ of the second voltage holding means group is connected to the photovoltaic cell string on one side of the photovoltaic cell module, and thus the cable for circuit element connection does not have to be placed to be laid across the entire length of the photovoltaic cell string in any photovoltaic cell string and the total cable amount that is required can be significantly reduced. In a case where the number of the photovoltaic cell strings is an even number, the circuit element needs to be connected in parallel to both ends of the N-th (or first) photovoltaic cell string, and thus a configuration in which the cable is placed to be laid across the entire length of the photovoltaic cell string is present. However, this configuration regarding cable placement is for only one photovoltaic cell string, and thus the total cable amount that is required can be significantly reduced in comparison to a configuration in which the cables are placed to be laid across the entire lengths of all the photovoltaic cell strings.

Figure 5:
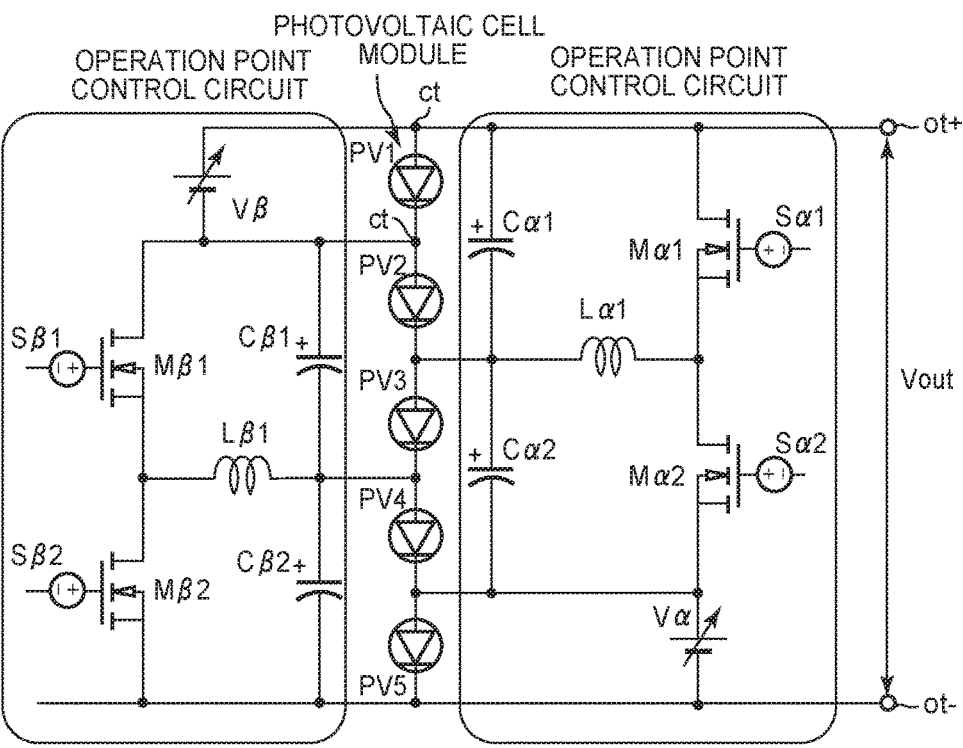
FIG. 5 is an exemplary circuit configuration diagram of another embodiment of the electric power generation operation point control circuit device according to the present disclosure.

Configuration of Another Embodiment Electric Power Generation Operation Point Control Circuit Device According to Present Disclosure In the circuit configuration that is illustrated in FIG. 3A, the variable voltage sources V$\alpha$, V$\beta$ are configured to apply the voltages VT$\alpha$, VT$\beta$ to both ends of columns of the corresponding switching means and hold the voltages at both ends of columns of the corresponding photovoltaic cell strings, respectively. However, the holding of the voltages at both ends of the photovoltaic cell string columns can also be realized with a configuration that is illustrated in FIG. 5 (series application type) in which the variable voltage sources are connected in parallel to the photovoltaic cell strings at both ends of the column of the photovoltaic cell strings connected in series and in series to the switching means groups. In the case of the example that is illustrated in this drawing, the variable voltage source is connected in parallel to the photovoltaic cell string PV1 at the anode-side end of the photovoltaic cell string column, the variable voltage source V$\alpha$ is connected in parallel to the photovoltaic cell string PV5 at the cathode-side end of the photovoltaic cell string column, the holding voltage of the variable voltage source V$\alpha$ is set to the voltage that is to be held in the photovoltaic cell string PV5, and the holding voltage of the variable voltage source is set to the voltage that is to be held in the photovoltaic cell string PV1. Then, the voltage between both ends of the first switching means group M$\alpha$1 to 2 is held as $$Vout - V5 = V1 + V2 + V3 + V4$$

and the voltage between both ends of the second switching means group M$\beta$1 to 2 is held as $$Vout - V1 = V2 + V3 + V4 + V5$$

and then this becomes similar to the case of FIG. 3A.

In a case where the circuit configuration that is illustrated in FIG. 5 is applied to the photovoltaic cell module exemplified in FIG. 8A, the variable voltage sources V$\alpha$, V$\beta$ in the actual circuit element placement are required to connect in parallel the circuit elements to both ends of the N-th (fifth in the drawing) and first photovoltaic cell strings with respect to the N-th (fifth in the drawing) and first photovoltaic cell strings, and thus the configuration in which the cable is placed to be laid across the entire length of the photovoltaic cell string is present. However, this configuration regarding cable placement is for only these photovoltaic cell strings, and thus the total cable amount that is required can be significantly reduced in comparison to the configuration in which the cables are placed to be laid across the entire lengths of all the photovoltaic cell strings. In a case where N is an even number, the voltage between both ends of the first switching means group corresponds to the output voltage and the holding of the voltage is achieved by means for holding the output voltage, and thus the variable voltage source Vα is not disposed.

Accordingly, in short regarding a series of the configurations of the device according to the present disclosure described above, a novel circuit configuration is adopted in which the means for regulating the photovoltaic cell string voltage is divided into the first voltage holding means group (Uαi) and the second voltage holding means group (Uβi). In the case of this circuit configuration, most of the components that respectively constitute the first voltage holding means group (Uαi) and the second voltage holding means group (Uβi) are divided to different sides and connected to the photovoltaic cell strings when the column of the photovoltaic cells connected in series is configured to be folded into a predetermined number, that is, by photovoltaic cell string unit, and thus the number of the cables laid across the entire length of one photovoltaic cell string is significantly reduced.

It should be noted that the device according to the present disclosure increases the number of configuration options that can be used for an electric power generation operation point control of groups of photovoltaic cells connected in series and may also be applied to configurations other than the photovoltaic cell module which is configured to be folded in units of photovoltaic cell string connected in series. Depending on location where the photovoltaic cell module is placed, for example, it is difficult for the voltage regulation circuit elements to be connected in parallel to all the cells, and the device according to the present disclosure may be applied, whether or not the photovoltaic cell module is configured to be folded in units of photovoltaic cell string, in cases such as a case where the placement of the circuit elements is facilitated by the circuit configuration according to the present disclosure.

In an aspect of the present disclosure, the "photovoltaic cell unit" refers to one unit body in the groups of the photovoltaic cells connected in series. Unless otherwise specified, the "photovoltaic cell unit" that is the unit bodies which are connected in series to each other may be any of a single photovoltaic cell, the "photovoltaic cell string" formed by the plurality of photovoltaic cells placed in a line and connected in series, and the photovoltaic cell group formed by the plurality of photovoltaic cells being connected in parallel. In addition, in the above description, the "photovoltaic cell module" refers to a configuration in which these N "photovoltaic cell units" are connected in series. In a case where the "photovoltaic cell unit" includes the plurality of photovoltaic cells connected in series, a common current flows through the photovoltaic cells. Accordingly, in the photovoltaic cell unit, the plurality of photovoltaic cells may be arranged such that the current difference between the respective photovoltaic cells attributable to the unevenness in light reception amount in the photovoltaic cell unit is within an allowable range. Furthermore, the device according to the aspect of the present disclosure described above may be advantageously applied to a case where the "photovoltaic cell module" is the configuration in which the N photovoltaic cell strings connected in series are arranged along the direction perpendicular to the longitudinal direction of the photovoltaic cell string and such that the anodes and the cathodes of the adjacent photovoltaic cell strings are opposite in direction to each other. Moreover, in the case of the photovoltaic cell, the "voltage holding means" for holding the voltage of the photovoltaic cell unit set is determined by the light reception amount and the flowing current as described above, and thus may be the means for regulating the amount of the current flowing through the photovoltaic cell unit or the photovoltaic cell unit set connected such that the voltage of the photovoltaic cell unit or the photovoltaic cell unit set becomes the voltage that is to be held.

As will be readily understood from the following description with reference to accompanying drawings, in the aspect of the present disclosure, the voltage between the anode-side and cathode-side output terminals of the column of the N photovoltaic cell units (output voltage of the photovoltaic cell module as a whole) is held in the column of the N photovoltaic cell units connected in series (that is, the photovoltaic cell module) in short while the first voltage holding means group and the second voltage holding means group are disposed, the first voltage holding means group including the voltage holding means for holding the voltage between the anode side and the cathode side for every set of the (2k+1)th and (2k+2)th photovoltaic cell units from the anode side in the photovoltaic cell module, the voltage holding means being (N−1)/2 (when N is an odd number) or N/2 (when N is an even number) voltage holding means, and the second voltage holding means group including the voltage holding means for holding the voltage between the anode side and the cathode side for every set of the (2k+2)th and (2k+3)th photovoltaic cell units from the anode side in the photovoltaic cell module, the voltage holding means being (N−1)/2 (when N is an odd number) or N/2 (when N is an even number) voltage holding means. Unless otherwise specified in the following description, the ordinal number that is used with respect to the photovoltaic cell unit is a number that is counted from the anode side. In a case where N is an even number, the voltage holding means on the second voltage holding means group side of the N-th or first photovoltaic cell unit exceptionally holds the voltage of only the N-th or first photovoltaic cell unit. This configuration is similar to the electric power generation operation point control circuit device according to the related art in that the voltage between the output terminals of the photovoltaic cell module is held but, in this configuration, the individual photovoltaic cell units are subjected to the holding of the voltage between the anode and the cathode by the voltage holding means on the first voltage holding means group side and the voltage holding means on the second voltage holding means group side with every two forming a set and the individual voltage holding means are connected to the respective photovoltaic cell units such that the set of the photovoltaic cell units subjected to the voltage holding by the first voltage holding means group side and the set of the photovoltaic cell units subjected to the voltage holding by the second voltage holding means group side are shifted one by one with respect to each other. Since two voltage holding means are connected to one photovoltaic cell unit, the difference in flowing current can be given between the two photovoltaic cell units connected to one voltage holding means as well and the voltage of the individual photovoltaic cell units can be controlled in accordance with the electric power generation voltage-current characteristics of the individual photovoltaic cell units (In the case of the configuration of the electric power generation operation point control circuit device according to the related art, the currents of the individual photovoltaic cell units can be regulated by both terminals of the voltage holding means (means including the voltage regulation circuit element such as the capacitor, the inductor, and the switching means) being connected in parallel to both terminals of each photovoltaic cell unit).

As will be described in detail in the following embodiment column, according to the aspect of the present disclosure, the voltage of the first photovoltaic cell unit of the photovoltaic cell module is determined by the difference between the voltage between the output terminals and the total sum of the voltages held by the second voltage holding means group, the voltage of the N-th photovoltaic cell unit of the photovoltaic cell module is determined by the difference between the voltage between the output terminals and the total sum of the voltages held by the first voltage holding means group, and each of the individual voltages of the rest of the photovoltaic cell units can be uniquely determined with regard to the voltages of the individual photovoltaic cell units when the number N of the photovoltaic cell units is an odd number. In addition, when the number N of the photovoltaic cell units is an even number, the voltage of the first (or N-th) photovoltaic cell unit of the photovoltaic cell module is determined by the difference between the voltage between the output terminals and the total sum of the voltages held by the second voltage holding means group, and thus each of the individual voltages of the rest of the photovoltaic cell units can be uniquely determined. According to the configuration described above, both ends of the circuit of each voltage holding means are connected to the anode of the photovoltaic cell string and the cathode of another photovoltaic cell string positioned immediately next to the anode with the photovoltaic cell strings being adjacent to each other particularly in a case where the photovoltaic cell unit is the photovoltaic cell string and the N photovoltaic cell strings connected in series are arranged in the photovoltaic cell module along the direction perpendicular to the longitudinal direction of the photovoltaic cell string and such that the anodes and the cathodes of the adjacent photovoltaic cell strings are opposite in direction to each other, and thus the amount of the cable that is required for the connection of the voltage holding means can be significantly reduced in comparison to a case where both of the ends are connected across with regard to one photovoltaic cell string as a whole. Accordingly, the device can become lighter in weight and an electric power loss associated with the length of the cable can become smaller than before.

Accordingly, the aspect of the present disclosure may be configured such that the output voltage between the pair of output terminals is held to become the total sum of the voltages at the respective maximum electric power points of the N photovoltaic cell units connected in series, the respective holding voltages of the voltage holding means of the first voltage holding means group are held to become the total sum of the voltages at the respective maximum electric power points of the photovoltaic cell units in the set of the corresponding photovoltaic cell units connected in series to each other and connected in parallel to the respective voltage holding means, and the respective holding voltages of the voltage holding means of the second voltage holding means group are held to become the total sum of the voltages at the respective maximum electric power points of the photovoltaic cell units in the set of the corresponding photovoltaic cell units connected in series to each other and connected in parallel to the respective voltage holding means or the voltage at the maximum electric power point of the corresponding photovoltaic cell unit. The voltages becoming the maximum electric power points of the individual photovoltaic cell units can be searched for as in the case of the electric power generation operation point control circuit device according to the related art, and the output voltage and the respective holding voltages of the voltage holding means may be adjusted based on a result of the search.

Basically, when the number of the photovoltaic cell units connected in series is four or more in the aspect of the present disclosure, means for configuration of the boosting chopper circuit including the voltage regulation circuit element such as the capacitor, the inductor, and the switching means may be used for the voltage holding means as in the electric power generation operation point control circuit device according to the related art as is exemplified in, for example, FIG. 7A. In the case of the device according to the present disclosure, however, each of the total sum of the holding voltages on the first voltage holding means group side (voltage to be realized by each photovoltaic cell unit on the second voltage holding means group side) and the total sum of the holding voltages on the second voltage holding means group side (voltage to be realized by each photovoltaic cell unit on the first voltage holding means group side) might differ from the output voltage, and thus the variable voltage sources giving a voltage that is equal to the total sum of the voltages (electric power generation voltages) to be realized by the respective photovoltaic cell units to both ends of the respective photovoltaic cell groups are disposed so that the entire voltage of the columns of the photovoltaic cell units connected to the respective groups (first photovoltaic cell unit group and second photovoltaic cell unit group) is held respectively on the first voltage holding means group side and the second voltage holding means group side.

Accordingly, to be specific regarding a case where N described above is an integer of four or more in the aspect of the present disclosure, the first voltage holding means group may be configured to include a first capacitor group including the capacitors connected in parallel via the electrode connection terminal for the anode side of the (2k+1)th photovoltaic cell unit and the cathode side of the (2k+2)th photovoltaic cell unit to each set of the (2k+1)th and (2k+2)th photovoltaic cell units in the N photovoltaic cell units connected in series to each other counted from the anode-side output terminal between the pair of output terminals (k being an integer ranging from zero to (N−3)/2 when N described above is an odd number and being an integer ranging from zero to (N−2)/2 when N described above is an even number), these capacitors being connected in series, the first switching means group including the switching means connected in parallel via the inductor to each of the capacitors of the first capacitor group and performing selective conduction between a pair of the electrode connection terminals connected to the capacitors, these switching means being connected in series, a first variable voltage source holding the voltage at both ends of the first switching means group at the electric power generation voltage of the photovoltaic cell unit connected in series between both ends of the first capacitor group, and first switching control means for controlling the conduction of the switching means such that the plurality of switching means cut off the conduction between the pair of connected electrode connection terminals at different timings of the same predetermined cycle in the first switching means group and one of the switching means cuts off the conduction between the pair of corresponding connected electrode connection terminals and the other switching means performs the conduction between the pair of corresponding connected electrode connection terminals at all times and a second voltage holding means group may be configured to include a second capacitor group including the capacitors connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units counted from the anode-side output terminal in the N photovoltaic cell units (k being an integer ranging from zero to (N−3)/2) when N described above is an odd number, these capacitors being connected in series, and including the capacitor connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units counted from the anode-side output terminal in the N photovoltaic cell units (k being an integer ranging from zero to (N−4)/2) and the capacitor connected in parallel via the electrode connection terminal for the anode side and the cathode side of the N-th or first photovoltaic cell unit to the N-th or first photovoltaic cell unit when N described above is an odd number, these capacitors being connected in series, the second switching means group including the switching means connected in parallel via the inductor to each of the capacitors of the second capacitor group and performing selective conduction between a pair of the electrode connection terminals connected to the capacitors, these switching means being connected in series, a second variable voltage source holding the voltage at both ends of the second switching means group at the electric power generation voltage of the photovoltaic cell unit connected in series between both ends of the second capacitor group, and second switching control means for controlling the conduction of the switching means such that the plurality of switching means cut off the conduction between the pair of connected electrode connection terminals at different timings of the same predetermined cycle in the second switching means group and one of the switching means cuts off the conduction between the pair of corresponding connected electrode connection terminals and the other switching means performs the conduction between the pair of corresponding connected electrode connection terminals at all times.

In the aspect of the present disclosure, each of the first and second voltage holding means groups is equivalent to the voltage holding means having a multi-stage boosting chopper circuit configuration in which each circuit formed by the capacitor connected to each photovoltaic cell unit set (two photovoltaic cell units forming one set) and the switching means connected via the inductor holds the voltage of the set of the respectively corresponding photovoltaic cell unit based on the voltage of the variable voltage source. In each of the first and second voltage holding means groups, the plurality of switching means are operated such that the conduction and cut-off between the terminals to which the switching means are respectively connected are repeated at the same predetermined cycle as described above and either one of the switching means cuts off the inter-terminal conduction when the other performs the inter-terminal conduction and, when the repeating operation (chopper operation) of the alternating conduction and cut-off of the switching means is executed as in the aspect described above, the voltage (electric power generation voltage) is held in the respective photovoltaic cell units with the voltage equal to the voltage of the variable voltage source being distributed as desired based on the chopper operation of each switching means.

In the configuration described above, output voltage holding means may by the MPPT control circuit or any other voltage/current controller as is the case with the prior electric power generation operation point control device. A voltage-variable electric power source such as the floating electric power source of any type can be adopted as the first variable voltage source of the first voltage holding means group and the second variable voltage source of the second voltage holding means group.

As an aspect regarding the first variable voltage source of the first voltage holding means group and the second variable voltage source of the second voltage holding means group in the aspect of the present disclosure, the variable voltage sources may be respectively connected in parallel to both ends of the first and second switching means groups between the output terminals and apply the voltage to be held thereby (parallel application type). When number N of the photovoltaic cell units is an odd number in a specific configuration in this case, the first variable voltage source may be the variable voltage source connected in parallel to both ends of the first switching means group and applying between both ends of the first switching means group the voltage equal to the total sum of the electric power generation voltages of the photovoltaic cell units connected in parallel with respect to both ends of the first switching means group and the second variable voltage source may be the variable voltage source connected in parallel to both ends of the second switching means group and applying between both ends of the second switching means group the voltage equal to the total sum of the electric power generation voltages of the photovoltaic cell units connected in parallel with respect to both ends of the second switching means group. When number N of the photovoltaic cell units is an even number, the first variable voltage source is the variable voltage source applying the voltage equal to the total sum of the electric power generation voltages of the N photovoltaic cell units and thus may be the output voltage holding means and the second variable voltage source may be the variable voltage source connected in parallel to both ends of the second switching means group and applying between both ends of the second switching means group the voltage equal to the total sum of the electric power generation voltages of the photovoltaic cell units connected in parallel with respect to both ends of the second switching means group.

In addition, as another aspect of the first variable voltage source of the first voltage holding means group and the second variable voltage source of the second voltage holding means group in the aspect of the present disclosure, the variable voltage source may be connected in series to each of the first and second switching means groups between the output terminals and apply the output voltage from which the voltage to be held at each of both ends of the first and second switching means groups is subtracted (series application type). In this case, the output voltage between the output terminals is held by the output voltage holding means, and thus the output voltage from which the voltage of the variable voltage source is subtracted is applied to each of both ends of the first and second switching means groups. Accordingly, when the number N of the photovoltaic cell units is an odd number in a specific configuration regarding this voltage application type, the first variable voltage source may be the variable voltage source connected in parallel via the electrode connection terminal for the anode side and the cathode side of the N-th photovoltaic cell unit counted from the anode-side output terminal and applying the voltage equal to the electric power generation voltage of the N-th photovoltaic cell unit and the second variable voltage source may be the variable voltage source connected in parallel via the electrode connection terminal for the anode side and the cathode side of the first photovoltaic cell unit counted from the anode-side output terminal and applying the voltage equal to the electric power generation voltage of the first photovoltaic cell unit. When the number N of the photovoltaic cell units is an even number, the first variable voltage source may be the output voltage holding means and the variable voltage source applying the voltage equal to the total sum of the electric power generation voltages of the N photovoltaic cell units and the second variable voltage source may be the variable voltage source connected in parallel via the electrode connection terminal for the anode side and the cathode side of the first photovoltaic cell unit counted from the anode-side output terminal and applying the voltage equal to the electric power generation voltage of the first photovoltaic cell unit.

As will be readily understood from the description in the following embodiment column with reference to accompanying drawings, according to the aspect of the present disclosure, both ends of the capacitor and the switching means are connected to the anode of one of the photovoltaic cell strings adjacent to each other and the cathode of another photovoltaic cell string positioned immediately next to the anode particularly in a case where the photovoltaic cell unit is the photovoltaic cell string and the N photovoltaic cell strings connected in series are arranged in the photovoltaic cell module along the direction perpendicular to the longitudinal direction of the photovoltaic cell string and such that the anodes and the cathodes of the adjacent photovoltaic cell strings are opposite in direction to each other, and thus the amount of the cable that is required for the connection of these circuit elements can be significantly reduced in comparison to a case where both of the ends are connected across with regard to one photovoltaic cell string as a whole. In the case of the configuration described above, cables are required for connection of the first and second variable voltage sources, but the number of the cables is four with each variable voltage source requiring a pair, and thus the total cable amount is expected to be reduced to a significant extent compared to a case where the cables for the capacitor and the switching means are laid across for all the N photovoltaic cell strings.

To be more specific regarding the relationship between the chopper operation of the switching means and the voltage held in each photovoltaic cell unit set in the aspect of the present disclosure, the height of the voltage held in each photovoltaic cell unit set is determined based on the ratio of the time width of the cut-off of the conduction of each switching means to the predetermined cycle (OFF time duty ratio). Then, in each of the first and second voltage holding means groups, the total sum of the voltages of the connected photovoltaic cell units becomes equal to the voltage of the first or second variable voltage source. Accordingly, in the configuration of the present disclosure described above, the ratio of the time width of the cut-off of the conduction between the pair of connected electrode connection terminals of each switching means in the first switching means group to the predetermined cycle may be controlled to become the ratio of the total sum of the electric power generation voltages of the set of the photovoltaic cell units corresponding to the respective switching means to the holding voltage held by the first variable voltage source and the ratio of the time width of the cut-off of the conduction between the pair of connected electrode connection terminals of each switching means in the second switching means group to the predetermined cycle may be controlled to become the ratio of the total sum of the electric power generation voltages of the set of the photovoltaic cell units corresponding to the respective switching means to the holding voltage held by the second variable voltage source.

In the aspect of the present disclosure, the operation at the maximum electric power point of each of the N photovoltaic cell units is achieved as described above by the output voltage being held to become the total sum of the voltages at the respective maximum electric power points of the N photovoltaic cell units, the holding voltage of the first variable voltage source being held to become the total sum of the voltages at the respective maximum electric power points of the photovoltaic cell units connected in the first switching means group, the holding voltage of the second variable voltage source being held to become the total sum of the voltages at the respective maximum electric power points of the photovoltaic cell units connected in the second switching means group, the OFF time duty ratio of each switching means in the first switching means group being regulated to become the ratio of the total sum of the electric power generation voltages at the respective maximum electric power points of the photovoltaic cell units of the set of the photovoltaic cell units corresponding to the respective switching means to the holding voltage held by the first variable voltage source, and the OFF time duty ratio of each switching means in the second switching means group being regulated to become the ratio of the total sum of the electric power generation voltages at the respective maximum electric power points of the photovoltaic cell units of the set of the photovoltaic cell units corresponding to the respective switching means to the holding voltage held by the second variable voltage source.

According to the aspect of the present disclosure, the electric power generation voltages of the photovoltaic cell units can be regulated to different values by the circuit configuration that differs from the electric power generation operation point control circuit device for a group of photovoltaic cells connected in series according to the related art, and thus all the photovoltaic cell units can be allowed to perform the electric power generation at the respective maximum electric power points. In addition, as described above, the advantage that the length of the cable for voltage holding means or voltage regulation circuit element connection can be significantly reduced can be obtained in a case where the photovoltaic cell strings in which the photovoltaic cell modules are connected in series are arranged. The present disclosure provides the device of novel configuration that allows the electric power generation voltage of a group of photovoltaic cells to be controlled in an appropriate manner based on the circuit configuration which differs from the prior electric power generation operation point control circuit device and increases the number of configuration options that can be used for an electric power generation operation point control of groups of photovoltaic cells connected in series. Accordingly, the present disclosure may also be applied to cases where the significant cable length reduction effect is not achieved in the photovoltaic cell module other than the photovoltaic cell module in which the photovoltaic cell strings are arranged as described above. It should be noted that such cases are also included in the scope of the present disclosure.

What is claimed is:
1. An electric power generation operation point control circuit device comprising:
a pair of output terminals formed by an anode-side output terminal and a cathode-side output terminal respectively connected to an anode-side end and a cathode-side end of a column of photovoltaic cell units in which

N photovoltaic cell units are connected in series, N being an integer of at least three;

an output voltage holding unit for holding a voltage between the pair of output terminals;

a plurality of electrode connection terminals connected to respective electrode terminals of the photovoltaic cell units connected in series between the pair of output terminals;

a first voltage holding unit group including a voltage holding unit for holding a voltage between an anode side of the (2k+1)th photovoltaic cell unit and a cathode side of the (2k+2)th photovoltaic cell unit by being connected in parallel via the electrode connection terminal for the anode side of the (2k+1)th photovoltaic cell unit and the cathode side of the (2k+2)th photovoltaic cell unit to each set of the (2k+1)th and (2k+2)th photovoltaic cell units connected in series to each other in the N photovoltaic cell units counted from the anode-side output terminal between the pair of output terminals, k being an integer ranging from zero to (N−3)/2 when the N is an odd number and an integer ranging from zero to (N−2)/2 when the N is an even number; and a second voltage holding unit group including a voltage holding unit for holding a voltage between an anode side of the (2k+2)th photovoltaic cell unit and a cathode side of the (2k+3)th photovoltaic cell unit by being connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units connected in series to each other in the N photovoltaic cell units counted from the anode-side output terminal between the pair of output terminals when the N is the odd number, k being an integer ranging from zero to (N−3)/2, and including a voltage holding unit for holding a voltage between the anode side of the (2k+2)th photovoltaic cell unit and the cathode side of the (2k+3)th photovoltaic cell unit by being connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units in the N photovoltaic cell units counted from the anode-side output terminal between the pair of output terminals, k being an integer ranging from zero to (N−4)/2, and a voltage holding unit for holding a voltage between the anode side and the cathode side of the N-th or first photovoltaic cell unit by being connected in parallel via the electrode connection terminal for the anode side and the cathode side of the N-th or first photovoltaic cell unit to the N-th or first photovoltaic cell unit when the N is the even number.

2. The electric power generation operation point control circuit device according to claim 1, wherein an output voltage between the pair of output terminals is held to become a total sum of voltages at respective maximum electric power points of the N photovoltaic cell units connected in series, wherein respective holding voltages of the voltage holding units of the first voltage holding unit group are held to become a total sum of voltages at the respective maximum electric power points of the photovoltaic cell units of the set of the corresponding photovoltaic cell units connected in series to each other and connected in parallel to the respective voltage holding units of the first voltage holding unit group, and wherein respective holding voltages of the voltage holding units of the second voltage holding unit group are held to become a total sum of voltages at the respective maximum electric power points of the photovoltaic cell units of the set of the corresponding photovoltaic cell units connected in series to each other and connected in parallel to the respective voltage holding units of the second voltage holding unit group or a voltage at the maximum electric power point of the corresponding photovoltaic cell unit.

3. The electric power generation operation point control circuit device according to claim 1, wherein N photovoltaic cell strings connected in series, the photovoltaic cell string being formed by a plurality of photovoltaic cells in which the photovoltaic cell units are placed in a row and connected in series, are aligned along a direction perpendicular to a longitudinal direction of the photovoltaic cell string and anodes and cathodes of the adjacent photovoltaic cell strings are opposite in direction to each other.

4. The electric power generation operation point control circuit device according to claim 1, wherein the N is an integer of at least four, wherein the first voltage holding unit group includes a first capacitor group having capacitors connected in parallel via the electrode connection terminal for the anode side of the (2k+1)th photovoltaic cell unit and the cathode side of the (2k+2)th photovoltaic cell unit to each set of the (2k+1)th and (2k+2)th photovoltaic cell units in the N photovoltaic cell units connected in series to each other counted from the anode-side output terminal between the pair of output terminals, k being an integer ranging from zero to (N−3)/2 when the N is the odd number and being an integer ranging from zero to (N−2)/2 when the N is the even number, these capacitors being connected in series, a first switching unit group having switching units connected in parallel via an inductor to each of the capacitors of the first capacitor group and performing selective conduction between a pair of the electrode connection terminals connected to the capacitors, these switching units being connected in series, a first variable voltage source holding a voltage at both ends of the first switching unit group at an electric power generation voltage of the photovoltaic cell unit connected in series between both ends of the first capacitor group, and a first switching control unit controlling the conduction of the switching unit such that a plurality of the switching units of the first switching unit group cut off the conduction between the pair of connected electrode connection terminals at different timings of the same predetermined cycle in the first switching means group and one of the switching units of the first switching unit group cuts off the conduction between the pair of corresponding connected electrode connection terminals and the other switching unit of the first switching unit group performs the conduction between the pair of corresponding connected electrode connection terminals at all times, and wherein the second voltage holding unit group includes a second capacitor group having capacitors connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units counted from the anode-side output terminal in the N photovoltaic cell units when the N is the odd number k being an integer ranging from zero to (N−3)/2, these capacitors being connected in series, and having a capacitor connected in parallel via the electrode connection terminal for the anode side of the (2k+2)th photovoltaic cell unit and the cathode side of the (2k+3)th photovoltaic cell unit to each set of the (2k+2)th and (2k+3)th photovoltaic cell units counted from the anode-side output terminal in the N photovoltaic cell units, k being an integer ranging from zero to (N−4)/2, and the capacitor connected in parallel via the electrode connection terminal for the anode side and the cathode side of the N-th or first photovoltaic cell unit to the N-th or first photovoltaic cell unit when the N is the odd number, these capacitors being connected in series, a second switching unit group having switching units connected in parallel via an inductor to each of the capacitors of the second capacitor group and performing selective conduction between a pair of the electrode connection terminals connected to the capacitors, these switching units being connected in series, a second variable voltage source holding a voltage at both ends of the second switching unit group at an electric power generation voltage of the photovoltaic cell unit connected in series between both ends of the second capacitor group, and a second switching control unit controlling the conduction of the switching unit such that a plurality of the switching units of the second switching unit group cut off the conduction between the pair of connected electrode connection terminals at different timings of the same predetermined cycle in the second switching means group and one of the switching units of the second switching unit group cuts off the conduction between the pair of corresponding connected electrode connection terminals and the other switching unit of the second switching unit group performs the conduction between the pair of corresponding connected electrode connection terminals at all times.

5. The electric power generation operation point control circuit device according to claim 4,
wherein a ratio of a time width of cut-off of the conduction between the pair of connected electrode connection terminals of each of the switching units of the first switching unit group to the predetermined cycle is controlled to become a ratio of a total sum of the electric power generation voltages of the set of the corresponding photovoltaic cell units of each of the switching units of the first switching unit group to the holding voltage held by the first variable voltage source, and
wherein a ratio of a time width of cut-off of the conduction between the pair of connected electrode connection terminals of each of the switching units of the second switching unit group to the predetermined cycle is controlled to become a ratio of a total sum of the electric power generation voltages of the set of the corresponding photovoltaic cell units of each of the switching units of the second switching unit group to the holding voltage held by the second variable voltage source.

6. The electric power generation operation point control circuit device according to claim 4,
wherein, when the N is the odd number, the first variable voltage source is the variable voltage source connected in parallel to both ends of the first switching unit group and applying between both ends of the first switching unit group the voltage equal to the total sum of the electric power generation voltages of the photovoltaic cell units connected in parallel with respect to both ends of the first switching unit group and the second variable voltage source is the variable voltage source connected in parallel to both ends of the second switching unit group and applying between both ends of the second switching unit group the voltage equal to the total sum of the electric power generation voltages of the photovoltaic cell units connected in parallel with respect to both ends of the second switching unit group.

7. The electric power generation operation point control circuit device according to claim 4,
wherein, when the N is the even number, the first variable voltage source is the output voltage holding unit and the variable voltage source applying the voltage equal to the total sum of the electric power generation voltages of the N photovoltaic cell units and the second variable voltage source is the variable voltage source connected in parallel to both ends of the second switching unit group and applying between both ends of the second switching unit group the voltage equal to the total sum of the electric power generation voltages of the photovoltaic cell units connected in parallel with respect to both ends of the second switching unit group.

8. The electric power generation operation point control circuit device according to claim 4,
wherein, when the N is the odd number, the first variable voltage source is the variable voltage source connected in parallel via the electrode connection terminal for the anode side and the cathode side of the N-th or first photovoltaic cell unit counted from the anode-side output terminal and applying the voltage equal to the electric power generation voltage of the N-th or first photovoltaic cell unit and the second variable voltage source is the variable voltage source connected in parallel via the electrode connection terminal for the anode side and the cathode side of the first photovoltaic cell unit counted from the anode-side output terminal and applying the voltage equal to the electric power generation voltage of the first photovoltaic cell unit.

9. The electric power generation operation point control circuit device according to claim 4,
wherein, when the N is the even number, the first variable voltage source is the output voltage holding unit and the variable voltage source applying the voltage equal to the total sum of the electric power generation voltages of the N photovoltaic cell units and the second variable voltage source is the variable voltage source connected in parallel via the electrode connection terminal for the anode side and the cathode side of the first photovoltaic cell unit counted from the anode-side output terminal and applying the voltage equal to the electric power generation voltage of the first photovoltaic cell unit.

\* \* \* \* \*

UNITED STATES PATENT AND TRADEMARK OFFICE
CERTIFICATE OF CORRECTION

PATENT NO. : 9,935,466 B2
APPLICATION NO. : 15/267320
DATED : April 3, 2018
INVENTOR(S) : Shinichi Urabe and Toshihisa Shimizu It is certified that error appears in the above-identified patent and that said Letters Patent is hereby corrected as shown below:

In Column 15, Line 29, after "D$\alpha$2", insert -- D$\beta$1 --.

In Column 15, Line 32, after "D$\alpha$2", insert -- D$\beta$1 --.

Signed and Sealed this
Fifteenth Day of May, 2018

Andrei Iancu
*Director of the United States Patent and Trademark Office*